(12) United States Patent
Saito et al.

(10) Patent No.: US 8,133,312 B2
(45) Date of Patent: Mar. 13, 2012

(54) DISPERSION OF A WATER-INSOLUBLE COLORANT, PRODUCTION METHOD THEREOF, RECORDING LIQUID, INK SET, PRINTED ARTICLE, IMAGE-FORMING METHOD AND IMAGE-FORMING APPARATUS USING THE SAME

(75) Inventors: Ryo Saito, Kanagawa (JP); Jun Matsumoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 596 days.

(21) Appl. No.: 12/289,436

(22) Filed: Oct. 28, 2008

(65) Prior Publication Data
US 2009/0117349 A1  May 7, 2009

(30) Foreign Application Priority Data

Oct. 30, 2007 (JP) ................................. 2007-282263

(51) Int. Cl.
*C09D 11/02* (2006.01)
(52) U.S. Cl. .................................... 106/31.65; 106/31.6
(58) Field of Classification Search .................. 106/31.6, 106/31.65
See application file for complete search history.

(56) References Cited

U.S. PATENT DOCUMENTS
2004/0237838 A1* 12/2004 Yatake et al. .............. 106/31.78

FOREIGN PATENT DOCUMENTS

| EP | 1 364 997 A2 | 11/2003 |
|---|---|---|
| EP | 1 693 423 A2 | 8/2006 |
| JP | 60-035055 | 2/1985 |
| JP | 2003-26972 | 1/2003 |
| JP | 2004-043776 | 2/2004 |
| JP | 2006-342316 | 12/2006 |
| JP | 2007-119586 | 5/2007 |

* cited by examiner

*Primary Examiner* — Jerry Lorengo
*Assistant Examiner* — Veronica F Faison
(74) *Attorney, Agent, or Firm* — Jean C. Edwards, Esq.; Edwards Neils PLLC

(57) ABSTRACT

A dispersion having particles of a water-insoluble colorant containing at least two kinds of pigments dispersed with a dispersing agent in a medium containing water, wherein the water-insoluble colorant has a crystalline structure, and a light-scattering intensity is 30,000 cps or less, when a peak value of absorbance in the visible light region is set to 1.

22 Claims, 2 Drawing Sheets

DISPERSION OF A WATER-INSOLUBLE COLORANT, PRODUCTION METHOD THEREOF, RECORDING LIQUID, INK SET, PRINTED ARTICLE, IMAGE-FORMING METHOD AND IMAGE-FORMING APPARATUS USING THE SAME

CROSS-REFERENCE TO RELATED APPLICATIONS

The present application claims priority from Japanese Patent Application No. 2007-282263, filed Oct. 30, 2007, the contents of which are herein incorporated by reference in their entirety.

FIELD OF THE INVENTION

The present invention relates to a dispersion of a water-insoluble colorant and a production method of the dispersion, a recording liquid, ink set, printed article (printed matter), image-forming method and image-forming apparatus using the dispersion.

BACKGROUND OF THE INVENTION

According to an inkjet recording method, high speed recording can be performed with a high freedom degree of imaging pattern and a low noise at the time of recording. Further, image recording can be performed at low cost. Still further, the inkjet recording method has advantages such that color recording can be readily performed. Therefore, recently the inkjet recording method is rapidly spreading and further developing. As a recording liquid for the method, hitherto a dye ink, in which a water-soluble dye is dissolved in an aqueous medium, has been widely used. However, the dye ink is poor in water resistance and weather resistance of the resultant printed article. Therefore, studies of the dye ink have been made to improve such disadvantage.

A pigment ink is ordinarily obtained by dispersing a water-insoluble pigment in an aqueous medium. It is general to use a method which includes adding a pigment together with one or plurality of dispersing agents such as various kinds of surfactants or water-soluble polymers to an aqueous solvent, and pulverizing them using a dispersion machine such as a sand mill, a bead mill, or a ball mill, to make the diameter of the pigment particle small to fine (see JP-A-2006-57044 ("JP-A" means unexamined published Japanese patent application) and JP-A-2006-328262). Besides, it is proposed to make pigments a solid solution in consideration of improving a coloring force and weather resistance (see JP-A-60-35055). Further, studies have been made of a method for preparing a pigment dispersion by dissolving an organic pigment together with a polymer dispersing agent or a polymer compound as a dispersing agent in an aprotic organic solvent in the presence of alkali, and then mixing the resultant solution with water (hereinafter the method is referred to as a build-up method), and of the predetermined polymer compounds per se and the like that are used in the above-described method (see JP-A-2003-26972, JP-A-2004-43776, JP-A-2006-342316, and JP-A-2007-119586). However, in the dispersion of pigment particles produced by the build-up method, particle formation so rapidly occurs that it is difficult to control a crystal form of the particles, or to regulate a crystallite diameter. With respect to finely divided pigment particles, it is desired that the pigment particles have a stable crystal form against light and a high crystallinity in consideration of achieving a high resistance to light. As means for achieving such objectives, for example, it is known to use a method of subjecting the pigment particles or the dispersion thereof to a heat treatment or the like (see JP-A-2003-26972).

SUMMARY OF THE INVENTION

The present invention resides in a dispersion, which comprises particles of a water-insoluble colorant containing at least two kinds of pigments dispersed with a dispersing agent in a medium containing water, wherein the water-insoluble colorant has a crystalline structure, and a light-scattering intensity is 30,000 cps (counts per second) or less, when a peak value of absorbance in the visible light region is set to 1 (cps).

Further, the present invention resides in a dispersion, which comprises particles of a water-insoluble colorant containing at least two kinds of pigments dispersed with a dispersing agent in a medium, wherein an average size of the particles is from 5 nm to 50 nm, and the water-insoluble colorant has a crystalline structure.

Further, the present invention resides in a recording liquid produced by any of the dispersion as described above, wherein the water-insoluble colorant is contained in an amount of 0.1 to 15% by mass with respect to a total mass of the recording liquid.

Further, the present invention resides in an ink set using the recording liquid for inkjet recording, as described above.

Further, the present invention resides in a printed article having an image recorded thereon by a means that can provide, with a medium, the recording liquid as described above, or the recording liquid by using the ink set as described above, wherein the means has a function to adjust an applied amount or concentration of the recording liquid, thereby light-to-dark contrast of the printed article is adjusted.

Further, the present invention resides in an image-forming method, which comprises: a step of recording an image by providing, with a medium, the recording liquid as described above, or the recording liquid by using the ink set as described above.

Further, the present invention resides in an image-forming apparatus having a means that can record an image by providing, with a medium, the recording liquid as described above, or the recording liquid by using the ink set as described above. Further, the present invention resides in a method of producing a dispersion containing a water-insoluble colorant, (13) A method of producing a dispersion containing a water-insoluble colorant, which comprises: (1) a step of dissolving a water-insoluble colorant together with a dispersing agent in an aprotic water-insoluble organic solvent in the presence of alkali, to prepare a solution thereof; (2) a step of preparing a dispersion by mixing the resultant solution with an aqueous solvent, in which particles of the water-insoluble colorant and the dispersing agent are dispersed in a medium containing water; (3) a step of converting the particle of the water-insoluble colorant into a soft aggregate thereof, the aggregate the water-insoluble colorant being capable of re-dispersing, and then separating the soft aggregate from the dispersion; (4) a step of filtrating and washing the soft aggregate with an ester series solvent or a ketone series solvent; and (5) a step of unbinding aggregation of the soft aggregate, and re-dispersing the unbound water-insoluble colorant in a re-dispersion medium.

Further, the present invention resides in a dispersion produced by the production method as described above.

Further, the present invention resides in a recording liquid containing the dispersion as described above.

Other and further features and advantages of the invention will appear more fully from the following description, appropriately referring to the accompanying drawings.

DETAILED DESCRIPTION OF THE INVENTION

Figure 1:
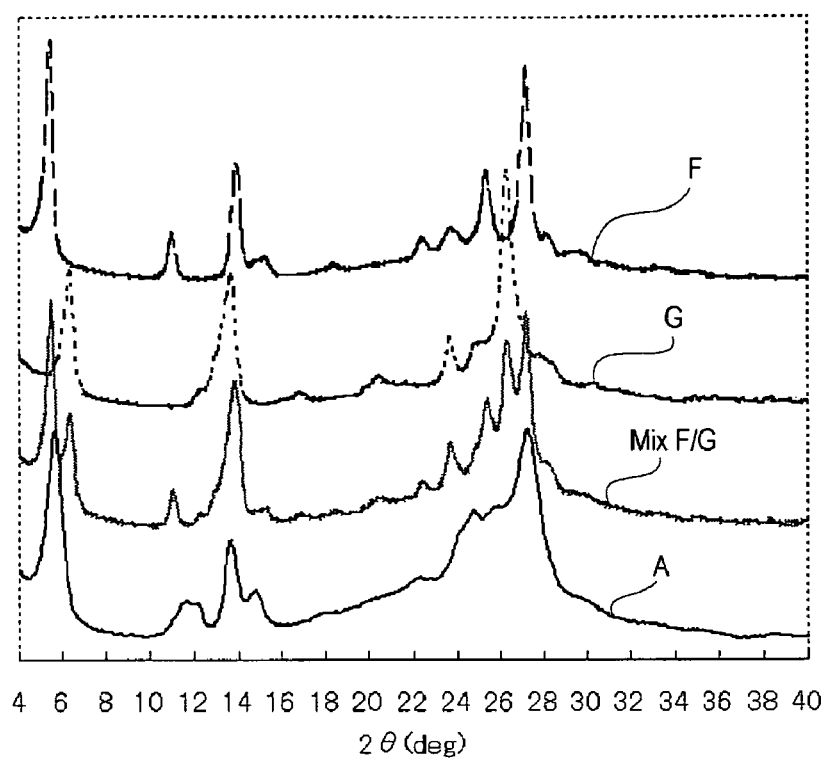
FIG. 1. is X-ray diffraction charts of powders of pigment particles obtained from Examples and Comparative Examples.

According to the present invention, there is provided the following means:

(1) A dispersion comprising particles of a water-insoluble colorant containing at least two kinds of pigments dispersed with a dispersing agent in a medium containing water, wherein the water-insoluble colorant has a crystalline structure, and a light-scattering intensity is 30,000 cps or less, when a peak value of absorbance in the visible light region is set to 1.

(2) The dispersion as described in (1), wherein an average size of the particles is from 5 nm to 50 nm.

(3) A dispersion comprising particles of a water-insoluble colorant containing at least two kinds of pigments dispersed with a dispersing agent in a medium, wherein an average size of the particles is from 5 nm to 50 nm, and the water-insoluble colorant has a crystalline structure.

(4) The dispersion as described in any one of (1) to (3), wherein the average size of the particles is from 5 nm to 40 nm.

(5) The dispersion as described in any one of (1) to (4), wherein the water-insoluble colorant is a solid solution comprising at least two kinds of pigments.

(6) The dispersion as described in any one of (1) to (5), wherein the water-insoluble colorant is a solid solution comprising at least two kinds of organic pigments selected from a group consisting of unsubstituted quinacridone, 2,9-dimethylquinacridone, 4,11-dichroloquinacridone, and 6,13-dihydroquinacridone.

(7) A recording liquid produced by the dispersion as described in any one of (1) to (6), wherein the water-insoluble colorant is contained in an amount of 0.1 to 15% by mass with respect to a total mass of the recording liquid.

(8) The recording liquid as described in (7), wherein the recording liquid is an inkjet recording liquid.

(9) An ink set using the inkjet recording liquid as described in (8).

(10) A printed article having an image recorded thereon by a means that can provide, with a medium, the recording liquid as described in (7) or (8), or the recording liquid by using the ink set as described in (9), wherein the means has a function to adjust an applied amount or concentration of the recording liquid, thereby light-to-dark contrast of the printed article is adjusted.

(11) An image-forming method, comprising: a step of recording an image by providing, with a medium, the recording liquid as described in (7) or (8), or the recording liquid by using the ink set as described in (9).

(12) An image-forming apparatus having a means that can record an image by providing, with a medium, the recording liquid as described in (7) or (8), or the recording liquid by using the ink set as described in (9).

(13) A method of producing a dispersion containing a water-insoluble colorant, which comprises: (1) a step of dissolving a water-soluble colorant together with a dispersing agent in an aprotic water-insoluble organic solvent in the presence of alkali, to prepare a solution thereof; (2) a step of preparing a dispersion by mixing the resultant solution with an aqueous solvent, in which particles of the water-insoluble colorant and the dispersing agent are dispersed in a medium containing water; (3) a step of converting the particles of the water-insoluble colorant into a soft aggregate thereof, the aggregate the water-insoluble colorant being capable of re-dispersing, and then separating the soft aggregate from the dispersion; (4) a step of filtrating and washing the soft aggregate with an ester series solvent or a ketone series solvent; and (5) a step of unbinding aggregation of the soft aggregate, and re-dispersing the unbound water-insoluble colorant in a re-dispersion medium.

(14) The method of producing a dispersion as described in (13), wherein the re-dispersion medium is a medium containing water so that the dispersion after re-dispersion is an aqueous dispersion.

(15) The method of producing a dispersion as described in (13) or (14), wherein the dispersing agent is a polymer compound that is soluble or dispersible in the ester series solvent or the ketone series solvent.

(16) A dispersion produced by the production method as described in any one of (13) to (15).

(17) A recording liquid containing the dispersion as described in (16).

The present inventors have found that a pigment ink which is prepared by the above-described method of producing pigments with a fine particle size by pulverizing them using a dispersion machine such as a sand mill, a bead mill, or a ball mill, shows a subsidiary absorption at the shorter wavelength side (high energy side), which sometimes results in change of tints according to the enrichment of the ink that is used in a printed article. Therefore, in case of the printing method in which light-to-dark contrast (gray scale or tone) of the printed article is adjusted by an applied amount of ink, or alternatively by a concentration or thickness of the ink, for example, in an inkjet recording method in which light-to-dark contrast of the printed article is adjusted by ejected amount of ink, a difference in tints between a low density region and a high density region of the printed article is caused. As a result, especially in the high density region, a color difference between the printed article and a press proof (a color proof) sometimes becomes conspicuous. Further, because the standard of the above press proof (a color proof) differs from one country to another, it is difficult to reproduce a color gamut similar to the color standard of each country by using a single kind of pigment.

Further, the present inventors have found that, with respect to the dispersion of the pigments with a fine particle size produced by the above build-up method, a heat treatment or the like applied to the dispersion at or after the fine-particle formation is sometimes insufficient to achieve a high resistance to light. Further, with respect to the dispersion produced by the build-up method, it is desired to improve further the stability of the dispersion. Further, when the dispersion is applied to a recording liquid or the like, it is desired that even though the dispersion is enriched (the concentration is made higher), a viscosity thereof is kept at a low level.

The organic pigment usable for the water-insoluble colorants of the present invention is not limited in hue and structure thereof. Specifically, examples thereof include perylene-compound pigments, perynone-compound pigments, quinacridone-compound pigments, quinacridonequinone-compound pigments, anthraquinone-compound pigments, anthanthorone-compound pigments, benzimidazolone-compound pigments, condensed disazo-compound pigments, disazo-compound pigments, azo-compound pigments, indanthrone-compound pigments, indanthrene-compound pigments, quinophthalone-compound pigments, quinoxalinedione-compound pigments, metal-complex azo-compound pigments, phthalocyanine-compound pigments, triarylcarbonium-compound pigments, dioxazine-compound pigments, aminoanthraquinone-compound pigments, diketopyrrolopyrrole-compound pigments, naphthol AS compound pigments, thioindigo-compound pigments, isoindoline-compound pigments, isoindolinone-compound pigments, pyranthrone-compound pigments, isoviolanthrone-compound pigments, and mixtures of any two or more thereof.

More specifically, examples of the organic pigment include perylene-compound pigments, such as C.I. Pigment Red 179, C.I. Pigment Red 190, C.I. Pigment Red 224, C.I. Pigment Violet 29, or the like; perynone-compound pigments, such as C.I. Pigment Orange 43, C.I. Pigment Red 194 or the like; quinacridone-compound pigments, such as C.I. Pigment Violet 19, C.I. Pigment Violet 42, C.I. Pigment Red 122, C.I. Pigment Red 192, C.I. Pigment Red 202, C.I. Pigment Red 207, C.I. Pigment Red 209 or the like; quinacridonequinone-compound pigments, such as C.I. Pigment Red 206, C.I. Pigment Orange 48, C.I. Pigment Orange 49, or the like; anthraquinone-compound pigments, such as C.I. Pigment Yellow 147 or the like; anthanthrone-compound pigments, such as C.I. Pigment Red 168 or the like; benzimidazolone-compound pigments, such as C.I. Pigment Brown 25, C.I. Pigment Violet 32, C.I. Pigment Yellow 180, C.I. Pigment Yellow 181, C.I. Pigment Orange 36, C.I. Pigment Orange 62, C.I. Pigment Red 185, or the like; condensed disazo-compound pigments, such as C.I. Pigment Yellow 93, C.I. Pigment Yellow 94, C.I. Pigment Yellow 95, C.I. Pigment Yellow 128, C.I. Pigment Yellow 166, C.I. Pigment Orange 34, C.I. Pigment Orange 13, C.I. Pigment Orange 31, C.I. Pigment Red 144 (C.I. Number: 20735), C.I. Pigment Red 166, C.I. Pigment Red 219, C.I. Pigment Red 220, C.I. Pigment Red 221, C.I. Pigment Red 242, C.I. Pigment Red 248, C.I. Pigment Red 262, C.I. Pigment Brown 23, or the like; disazo-compound pigments, such as C.I. Pigment Yellow 13, C.I. Pigment Yellow 83, C.I. Pigment Yellow 188, or the like; azo-compound pigments, such as C.I. Pigment Red 187, C.I. Pigment Red 170, C.I. Pigment Yellow 74, C.I. Pigment Red 48, C.I. Pigment Red 53, C.I. Pigment Orange 64, C.I. Pigment Red 247, or the like; indanthrone (indanthrene)-compound pigments, such as C.I. Pigment Blue 60, or the like; quinophthalone-compound pigments, such as C.I. Pigment Yellow 138, or the like; quinoxalinedione-compound pigments, such as C.I. Pigment Yellow 213, or the like; metal-complex azo-compound pigments, such as C.I. Pigment Yellow 129, C.I. Pigment Yellow 150, or the like; phthalocyanine-compound pigments, such as C.I. Pigment Green 7, C.I. Pigment Green 36, C.I. Pigment Green 37, C.I. Pigment Blue 16, C.I. Pigment Blue 75, C.I. Pigment Blue 15 (including 15:1, 15:6 or the like), or the like; triaryl carbonium-compound pigments, such as C.I. Pigment Blue 56, C.I. Pigment Blue 61, or the like; dioxazine-compound pigments, such as C.I. Pigment Violet 23, C.I. Pigment Violet 37, or the like; aminoanthraquinone-compound pigments, such as C.I. Pigment Red 177, or the like; diketopyrrolopyrrole-compound pigments, such as C.I. Pigment Red 254, C.I. Pigment Red 255, C.I. Pigment Red 264, C.I. Pigment Red 272, C.I. Pigment Orange 71, C.I. Pigment Orange 73, or the like; naphthol AS compound pigments, such as C.I. Pigment Red 187, C.I. Pigment Red 170, or the like; thioindigo-compound pigments, such as C.I. Pigment Red 88, or the like; isoindoline-compound pigments, such as C.I. Pigment Yellow 139, C.I. Pigment Orange 66, or the like; isoindolinone-compound pigments, such as C.I. Pigment Yellow 109, C.I. Pigment Yellow 110, C.I. Pigment Orange 61, or the like; pyranthrone-compound pigments, such as C.I. Pigment Orange 40, C.I. Pigment Red 216, or the like; or isoviolanthrone-compound pigments, such as C.I. Pigment Violet 31, or the like.

In the dispersion of the present invention, at least two kinds of organic pigment components are contained in the particles of the water-insoluble colorant. A content of the water-insoluble colorant in the dispersion is not particularly limited. In consideration of application to an ink, for example, it is preferably from 0.01% by mass to 30% by mass, more preferably from 1.0% by mass to 20% by mass, and most preferably from 1.1% by mass to 15% by mass.

In the dispersion of the present invention, even though a concentration of the dispersion is high, a change of tint is small, while a viscosity of the dispersion is kept at a low level. For example, when the dispersion is applied to a recording liquid, a freedom degree of the kind and addition amount of additives that can be used in the recording liquid is increased. Accordingly, the water-insoluble colorant can be preferably used in the above content range.

A combination of two or more organic pigments is not particularly limited. However, it is preferred to combine the same type of organic pigments such as a combination of azo compound pigments, or a combination of diketopyrrolopyrrole compound pigments. In other words, it is preferred to use a combination of organic pigments having a similar skeleton to each other. Specifically, there are preferable combinations such as C.I. pigment violet 19 and C.I. pigment red 122; C.I. pigment violet 19 and C.I. pigment red 122 and C.I. pigment red 209; C.I. pigment yellow 128 and C.I. pigment yellow 74; and C.I. pigment yellow 128 and C.I. pigment orange 13. Further, it is preferred to use at least another organic pigment that is different by the range of 10 nm to 200 nm, especially from 10 nm to 100 nm from the maximum absorption wavelength (λmax) of one organic pigment of two or more kinds of organic pigment components. It should be noted that the absorption wavelength of the pigment used in the present invention means a wavelength in the state of particles, namely the state of particles coated on or incorporated in a medium, but it does not mean a wavelength in the state of solution of the pigment dissolved in a specific medium such as alkali or acid.

The maximum absorption wavelength (λmax) of a primary organic pigment component is not particularly limited. However, it is practical in a coloring application to use organic pigment compounds having the maximum absorption wavelength within the visible light region. For example, it is preferred to use organic pigment compounds having the maximum absorption wavelength in the range of 300 nm to 750 nm.

When the above two or more kinds of organic pigments are used, a content of each organic pigment component is not particularly limited. However, a ratio by mass of the two pigments is preferably set to be from 0.5:9.5 to 9.5:0.5, more preferably from 1:9 to 9:1. For the purpose of achieving a tint of color gamut different from a single pigment component, it is furthermore preferable that a ratio by mass of the two pigments is set to be from 2:8 to 8:2. The dispersion may be prepared even outside the range of 0.5:9.5 to 9.5:0.5. However, a color of the thus-obtained dispersion becomes almost the same as the color of a single pigment component. When three kinds of pigments are used, it is preferred to use each pigment in a proportion of 5% by mass to 90% by mass, more preferably from 10% by mass to 80% by mass to a total amount of the pigments.

The dispersion of the present invention can be preferably prepared by the steps: (1) a step of dissolving a water-insoluble colorant together with a dispersing agent in an aprotic water-soluble organic solvent in the presence of alkali, to prepare a solution thereof, (2) a step of preparing a dispersion by mixing the resultant solution with an aqueous solvent, in which particles of the water-insoluble colorant and the dispersing agent are dispersed in a medium containing water, (3) a step of converting the particles of the water-insoluble colorant into a soft aggregate thereof, the aggregate of the water-insoluble colorant being capable of re-dispersing, and then separating the soft aggregate from the dispersion, (4) a step of filtrating and washing the soft aggregate with an ester series solvent or a ketone series solvent, and (5) a step of unbinding aggregation of the soft aggregate, and re-dispersing the unbound water-insoluble coloring material in a re-dispersion medium. In the present invention, a water-insoluble colorant may be a water-insoluble colorant containing at least two kinds of pigments.

Any kind of aprotic solvent may be used in the present invention, so long as the solvent is able to dissolve an organic pigment and a polymer compound in the presence of alkali solvents. Aprotic solvents having 5% by mass or more of solubility to water are preferably used. Furthermore, aprotic solvents that can be freely mixed with water are preferable.

Specifically, examples of preferable solvents include dimethylsulfoxide, dimethylimidazolidinone, sulfolane, N-methylpyrrolidone, dimethylformamide, acetonitrile, acetone, dioxane, tetramethylurea, hexamethylphosphoramide, hexamethylphosphoro triamide, pyridine, propionitrile, butanone, cyclohexanone, tetrahydrofuran, tetrahydro pyran, ethyleneglycol diacetate, and γ-butyrolactone. Of these solvents, dimethylsulfoxide, N-methylpyrrolidone, N,N-dimethylformamide, dimethylimidazolidinone, sulfolane, acetone, acetonitrile, and tetrahydrofuran are preferable. Further, these solvents may be used singly or in a combination thereof.

A proportion of the aprotic solvent to be used is not particularly limited. However, it is preferred to use the solvent in the proportion of 2 parts by mass to 500 parts by mass, more preferably from 5 parts by mass to 100 parts by mass with respect to 1 part by mass of the pigment respectively, in order to improve a dissolution state of the pigment, to form easily a pigment having a desired particle size, and to improve a color density of aqueous dispersion.

Examples of the alkali that can be contained in the above aprotic solvents include inorganic bases such as sodium hydroxide, calcium hydroxide, and barium hydroxide; and organic bases such as trialkylamine, diazabicycloundecene (DBU), and metal alkoxides. Among these, the inorganic bases are preferably used.

The amount of the base to be used is not particularly limited. In the case of the inorganic base, the amount thereof is preferably from 1.0 to 30 mole equivalents, more preferably from 2.0 to 25 mole equivalents, and particularly preferably from 3 to 20 mole equivalents, to the pigment. In the case of the organic base, the amount thereof is preferably from 1.0 to 100 mole equivalents, more preferably from 5.0 to 100 mole equivalents, and particularly preferably from 20 to 100 mole equivalents, to the pigment.

In the present invention, the "aqueous solvent" refers to water alone, or a mixed solvent of water and an organic solvent soluble in water. The addition of the organic solvent is preferably used, for example, (i) in the case where only water is not sufficient for uniformly dissolving a pigment and a dispersing agent, (ii) in the case where only water is not sufficient for obtaining viscosity required for the flow through a flow path, and the like. In the case of alkaline, for example, the organic solvent is preferably an amide series solvent or a sulfur-containing compound solvent, more preferably the sulfur-containing-compound solvent and particularly preferably dimethylsulfoxide (DMSO). In the case of acidic, the organic solvent is preferably a carboxylic acid series solvent, a sulfur-containing compound solvent or a sulfonic acid series solvent, more preferably a sulfonic acid series solvent, and particularly preferably methanesulfonic acid. Additionally, an inorganic compound salt and a dispersing agent as described below may be dissolved into the aqueous solvent as required.

In this case, the embodiment wherein a solution of a water-insoluble colorant (organic pigment) homogeneously dissolved therein and an aqueous solvent are mixed is not particularly limited. Examples of the embodiment include an embodiment in which a water-insoluble colorant solution is added to an aqueous solvent with being stirred, and an embodiment in which a water-insoluble colorant solution and an aqueous solvent are each delivered to a certain length of flow path in the same longitudinal direction, and both the solution and the solvent contact with each other in the course of getting through the flow path, thereby to deposit organic fine pigment particles. With respect to the former (the embodiment of stirring and mixing), it is especially preferred to use an embodiment in which a feed pipe or the like is introduced in an aqueous solvent so that a water-insoluble colorant solution is fed from the pipe for addition in liquid. More specifically, the addition in liquid can be performed by using an apparatus described in International Publication WO 2006/121018 pamphlet, paragraphs 0036 to 0047. With respect to the latter (the embodiment of mixing both the liquid and the solvent by using the flow path), there can be used micro reactors described in JP-A-2005-307154, paragraphs 0049 to 0052 and FIGS. 1 to 4, and JP-A-2007-39643, paragraphs 0044 to 0050.

A condition for deposition and formation of the particles of the water-insoluble colorant is not particularly limited, and can be selected from a range from a normal pressure condition to a subcritical or supercritical condition. The temperature at which the particles are prepared under normal pressure is preferably −30 to 100° C., more preferably −10 to 60° C., and particularly preferably 0 to 30° C. A mixing ratio of the water-insoluble colorant solution to the aqueous solvent is preferably 1/50 to 2/3, more preferably 1/40 to 1/2, and particularly preferably 1/20 to 3/8 in volume ratio. The concentration of the particles of the water-insoluble colorant in the mixed liquid at the time of deposition of the particles is not particularly limited, but the amount of the particles of the water-insoluble colorant is preferably 10 to 40,000 mg, more preferably 20 to 30,000 mg, and particularly preferably 50 to 25,000 mg, per 1,000 ml of the solvent.

As the dispersing agent that is used in the present invention, there can be properly used compounds that are soluble in an aprotic solvent in the presence of alkali, and that can form pigment-containing particles in an aqueous solvent upon a mixture of a liquid of both the water-insoluble colorant and the dispersing agent dissolved therein together with the aqueous solvent whereby a dispersing effect is obtained. As a preferable dispersing agent, it is possible to use a surfactant or a polymer compound that is composed of at least one hydrophilic component selected from a group consisting of a carboxylic acid group, a sulfonic acid group, a phosphoric acid group, a hydroxyl group, and an alkyleneoxide. More preferable dispersing agent is a compound that can dissolve stably together with organic pigments in an aprotic organic solvent in the presence of alkali. When a hydrophilic component of the dispersing agent is composed of only other group (s) than the above groups, such as a primary, secondary, or tertiary amino group and a quaternary ammonium group, a dispersion property is sufficient in aqueous dispersion. However, a degree of dispersion stability sometimes becomes relatively small. Besides, in the conventional pigment dispersion method, it is necessary to think out, for example, to select a dispersing agent that can efficiently contact with a surface of the pigments dispersed in a medium. In the present invention, both the pigment and the dispersing agent are present in the dissolution state in the medium, so that a desired function between them can be easily achieved. As a result, no limitation to the dispersing agent owing to contact efficiency on the pigment surface is required, which is different from the conventional pigment dispersion method. Accordingly, a wide range of dispersing agents may be used in the present invention.

Specifically, the surfactant that can be used in the present invention may be properly selected from previously known surfactants and derivatives thereof, including anionic surfactants such as alkylbenzene sulfonic acid salts, alkylnaphthalene sulfonic acid salts, higher fatty acid salts, sulfonic acid salts of higher fatty acid esters, sulfuric acid ester salts of higher alcohol ether, sulfonic acid salts of higher alcohol ether, alkylcarboxylic acid salts of higher alkylsulfonamide, and alkylphosphoric acid salts; nonionic surfactants such as polyoxyethylene alkylethers, polyoxyethylene alkylphenylethers, polyoxyethylene fatty acid esters, sorbitan fatty acid esters, ethyleneoxide adducts of acetylene glycol, ethyleneoxide adducts of glycerol, and polyoxyethylene sorbitan fatty acid esters; and in addition to the above, amphoteric surfactants such as alkyl betaines and amido betaines; and silicone-based surfactants and fluorine-based surfactants.

Specific examples of the polymer dispersing agent include polyvinyl pyrrolidone, polyvinyl alcohol, polyvinyl methyl ether, polyethylene oxide, polyethyleneglycol, polypropyleneglycol, and polyacrylamide. Polyvinyl pyrrolidone is preferably used.

Further, examples of the polymer compounds that can be used as other dispersing agents include block-copolymers, random copolymers, or graft copolymers, or modified materials of these copolymers and salts thereof, each of which is composed of at least two monomer components selected from styrene, styrene derivatives, vinylnaphthalene, vinylnaphthalene derivatives, aliphatic alcohol esters of α,β-ethylenycally unsaturated carboxylic acid, acrylic acid, acrylic acid derivatives, methacrylic acid, methacrylic acid derivatives, maleic acid, maleic acid derivatives, alkenyl sulfonic acids, vinyl amines, allyl amines, itaconic acid, itaconic acid derivatives, fumaric acid, fumaric acid derivatives, vinyl acetate, vinyl phosphoric acid, vinyl pyrrolidone, acrylamide, N-vinyl acetoamide, N-vinylformamide and N-vinylformamide derivatives, with the proviso that at least one of the monomers has a functional group that becomes a carboxylic acid group, a sulfonic acid group, a phosphoric acid group, a hydroxyl group or an alkyleneoxide.

In more detail, the polymer compounds that can be used in the present invention are preferably composed of a hydrophilic group portion and a hydrophobic group portion. As the polymer compounds, it is preferable to use copolymers that can be obtained by copolymerizing a hydrophilic monomer component and a hydrophobic monomer component. When polymers (polymer compounds) that are composed of only hydrophobic monomer components are used, it sometimes becomes difficult to impart good dispersion stability to a water-insoluble colorant. It should be noted that the term "hydrophilic" means a good affinity with water and a high water solubility, whereas the "hydrophobic" means a poor affinity with water and a sparse water solubility.

Examples of the hydrophobic monomer component include monomer components having, as a structure unit, a hydrophobic unit such as an isobutyl group, a t-butyl group, a phenyl group, a biphenyl group, and a naphthyl group. From a viewpoint of imparting high dispersion stability to the water-insoluble colorant, preferred are block segments having, as a recurring unit, a hydrophobic monomer such as styrene or t-butyl methacrylate. However, the hydrophobic monomer component is not limited to these materials.

Examples of the hydrophilic monomer component include monomer components containing, as a structure unit, a hydrophilic unit having a functional group such as the aforementioned carboxylic acid group, sulfonic acid group, phosphoric acid group, hydroxyl group, and alkyleneoxide. Specifically, examples of the hydrophilic monomer include acrylic acid, methacrylic acid; carboxylic acid salts such as inorganic salts or organic salts of acrylic acid, or methacrylic acid; polyethyleneglycol macromonomers; vinyl alcohol, and 2-hydroxyethylmethacrylate. However, the hydrophilic monomer component is not limited to these materials.

The above copolymers may have any form such as block-copolymers, random copolymers, and graft copolymers. Use of the block-copolymers, or graft copolymers is especially preferable because those copolymers impart an excellent dispersibility to a water-insoluble colorant.

As the polymer compound that are used as a dispersing agent, there can be preferably used natural polymer compounds such as albumin, gelatin, rosin, shellac, starch, gum Arabic, and sodium alginate; and their modified compounds. Further, these dispersing agents may be used singly, or in a combination thereof. A ratio of these dispersing agents to be used is not particularly limited. However, it is preferred to use the dispersing agent in a proportion of 0.05 parts by mass or more with respect to 1 part by mass of the organic pigment, and 50 parts by mass or less with respect to 100 parts by mass of the aprotic organic solvent. When the proportion of the dispersing agent is too large with respect to the aprotic organic solvent, it is sometimes difficult to make the dispersing agent dissolve in the solvent. On the other hand, when the proportion of the dispersing agent is too small with respect to the organic pigment, it is sometimes difficult to achieve a sufficient dispersion effect.

In order to improve weather resistance when the dispersion of the present invention is used as an ink that is described below, the above-described dispersing agents can be preferably used. However, it is especially preferred to use a polymer dispersing agent or a polymer compound, each of which is soluble or dispersible in a particular solvent that is used for a cleaning process that is described below, in consideration of providing light resistance and maintaining the dispersion at a low viscosity level even though the dispersion are concentrated. The molecular weight of the polymer dispersing agent or the polymer compound is not particularly limited, but is preferably in the range of 500 to 1,000,000, and more preferably from 1,000 to 1,000,000 in terms of the mass average molecular weight respectively. When the molecular weight is too small, the polymer cannot function as a dispersing agent. On the other hand, when the molecular weight is too large, entanglement among polymeric chains becomes too large. As a result, it becomes difficult for them to serve as a dispersing agent, which occasionally makes it difficult to maintain a good dispersion state. It should be noted that when described simply as a molecular weight in the present invention, the molecular weight means a mass average molecular weight, and the mass average molecular weight, unless indicated otherwise, means an average molecular mass calculated in terms of polystyrene that is measured by gel permeation chromatography (carrier: tetrahydrofuran). It should be also noted that the term "dispersion" that is used in the present invention means a composition having prescribed fine particles dispersed therein. The form of the dispersion is not particularly limited. The dispersion is used as a meaning to embrace a liquid composition (dispersion liquid), a past-like composition, and a solid composition.

The amount of the dispersing agent that is contained in a liquid of a water-insoluble colorant solution dissolved therein is preferably in the range of 0.1 part by mass to 1000 parts by mass, more preferably from 1 part by mass to 500 parts by mass, and most preferably from 10 parts by mass to 250 parts by mass, with respect to 100 parts by mass of pigment, in order to further improve an uniform dispersity and a storage stability of the pigment. Too small amount of the dispersing agent sometimes has no effect to improve dispersion stability of organic pigments fine particles. There is no particular limitation on an amount of the dispersing agent that is contained in the aqueous dispersion of the present invention. However, it is practical to use the dispersing agent in an amount of 10 parts by mass to 1000 parts by mass, with respect to 100 parts by mass of pigment.

[Average Particle Diameter from Observation by Transmission Electron Microscope]

In the present invention, a form of the water-insoluble colorant particles that are contained in the dispersion is observed by using a transmission electron microscope (TEM), to calculate an average particle diameter thereof as described below. The dispersion (dispersion liquid) containing fine particles of water-insoluble colorant is diluted. The diluted dispersion is dropped onto a Cu 200 mesh to which a carbon film is attached, and then the fine particles are dried on the mesh. The diameter of each of 300 particles is measured from images of the particles photographed to 100000 times using TEM (1200EX, manufactured by JEOL Ltd.), and then an average particle diameter is calculated. At this time, because the dispersion is dried on the Cu 200 mesh as described above, even the water-insoluble colorant is in a state well dispersed in the dispersion, there is a case where particles of the water-insoluble colorant apparently aggregate during the dry step, which makes it difficult to discriminate an accurate particle size. In this case, an average particle diameter is calculated by using isolated 300 particles that are not piled on other particles. When the particles of the water-insoluble colorant are not spherical, the width of the particle cross section (the longest size of the particle) is measured.

In one embodiment of the present invention, an average particle size of the water-insoluble colorant is from 5 nm to 50 nm. Especially, the average particle size of the water-insoluble colorant that is calculated from observation by using the transmission electron microscope (TEM) is preferably from 5 nm to 50 nm, and more preferably from 5 nm to 45 nm. It is especially preferable that the average particle size is from 5 nm to 40 nm from a viewpoint of transparency of the dispersion and compatibility of dispersion stability and resistance to light in the dispersion. When the average particle size is too small, it is sometimes difficult to keep a stable dispersion state in the dispersion for a long time, or it is sometimes difficult to obtain excellent resistance to light. On the other hand, when the average particle size is too large, it is sometimes difficult to obtain good transparency of the dispersion. In the present invention, the water-insoluble colorant that contains two or more kinds of pigments may consist of pigments, or may contain additional compounds other than the pigments. At this time, it is preferable that the particles of the water-insoluble colorant are composed of a solid solution of two or more kinds of pigments. However, a mixture of a portion having a crystalline structure and another portion having a non-crystalline structure may be present in the particle. Further, the particle may be composed of a core to which the above dispersing agent (a polymer compound, a surfactant or the like) is adhered so as to cover the core therewith, a component of the core being pigments or a mixture of the pigments and another compound.

The water-insoluble colorant that is used in the present invention may be contained in resin fine particles or inorganic fine particles. At this time, it is preferable that the resin fine particles and inorganic fine particles are a non-colored component in order not to degrade a tint of the water-insoluble colorant. An average particle size of the resin fine particles or the inorganic fine particles is preferably from 6 nm to 200 nm. When the dispersion of the water-insoluble colorant is used as an inkjet recording liquid, the average particle size is more preferably from 6 nm to 150 nm, and especially preferably from 6 nm to 100 nm, from a viewpoint of obtaining excellent discharge (emission) stability.

[Average Particle Diameter According to a Dynamic Light-Scattering Method]

In the present invention, a dispersion state of the water-insoluble colorant may be also evaluated according to a dynamic light-scattering method. Thereby, an average particle diameter of the water-insoluble colorant can be calculated. The principle of evaluation is detailed below. Particles with the size ranging from about 1 nm to about 5 μm are momentarily changing their position and direction in Brownian motion such as translation and rotation. Accordingly, by irradiating a laser light to these particles and then detecting the resultant scattered light, fluctuation of the scattered light intensity depending on Brownian motion is observed. By observing the fluctuation of the scattered light intensity with respect to time, a speed (diffusion coefficient) of the particles in Brownian motion is calculated and the size of the particles can be known.

Applying the above principle, an average particle diameter of the water-insoluble colorant is measured. When the measured value is similar to the average particle diameter that is obtained from the TEM observation, it means that the particles in a liquid are in mono dispersion (the situation in which particles are neither bonding nor aggregating to each other). Namely, particles are each dispersed in a dispersion medium with keeping an interval between particles, so that they can move singly and independently.

In the present invention, it has been found that the arithmetic average particle diameter of the water-insoluble colorant in a dispersion medium measured according to the dynamic light-scattering method is almost the same level as the average particle diameter obtained from TEM observation. In other words, it has been confirmed that a mono dispersion of the water-insoluble colorant in a dispersion medium according to the present invention can be attained. The arithmetic average particle size of the water-insoluble colorant in the dispersion medium according to the dynamic light-scattering method is preferably 50 nm or less, and more preferably 45 nm or less, and especially preferably 40 nm or less. Thus, a preferable range of the arithmetic average particle size is not substantially different from that obtained from TEM observation. In the present invention, unless indicated otherwise, the simply described "average particle diameter" means the aforementioned average diameter. It should be noted that even though the water-insoluble colorant in a dispersion medium is completely in a monodispersion, error of measurement or the like sometimes causes a difference between the average particle size according to the dynamic light-scattering method and the average particle size from TEM observation. For example, it is necessary that a concentration of a liquid to be measured is suitable for both the performance of the measurement apparatus and the method of detecting scattered light. Accordingly, error occurs unless a liquid to be measured has a concentration enough to secure a sufficient amount of transmission of light. Further, when nano-sized particles are measured, the obtained signal intensities are so feeble that they are strongly affected by dust, which causes errors. Therefore, it is necessary to take care of pre-treatment of the sample and purity of environment for measurement. When nano-sized particles are measured, a laser light source having a transmission output of 100 mV or more is suitable for enhancing intensities of scattered light.

Further, it is preferable that a particle size distribution of the water-insoluble colorant in a dispersion medium according to the present invention is monodispersion. Monodisperse particles are advantageous because adverse influence owing to light-scatting at large-sized particles can be reduced. In addition, when aggregate is formed by using the dispersion at printing, recording, or the like, the mono dispersion has advantages to control of a filling form of the formed aggregate or the like. As an indicator that is used to evaluate dispersity of the dispersion, for example, there can be used a difference between the diameter (D90) of particles that occupy 90% by number and the diameter (D10) of particles that occupy 10% by number of the total particle numbers, in the following integral equation of the particle diameter distribution function with respect to the arithmetic average particle diameter that is obtained according to the dynamic light-scattering method:

$$dG=f(D) \times d(D)$$

(Where, G represents the number of particles; and D represents a primary particle size.)

In the present invention, the above difference between the size (D90) and the size (D10) is preferably 45 nm or less, and more preferably from 1 nm to 30 nm, and especially preferably from 1 nm to 20 nm. It should be noted that the above method can be suitably used in the particle diameter distribution curve that is prepared by using the particle diameter that is obtained from observation by using a transmission electron microscope.

Further, as another indicator that is used to evaluate dispersity, there can be also used a ratio of a volume average particle size (Mv) to a number average particle size (Mn), namely a ratio of (Mv)/(Mn). Both Mv and Mn are obtained by the dynamic light-scattering method. In the aqueous dispersion of the present invention, the aforementioned ratio (Mv)/(Mn) of the water-insoluble colorant is preferably 1.5 or less, and more preferably 1.4 or less, and still more preferably 1.3 or less.

[Definition of Crystallite Diameter]

Measurement and calculation of the crystallite diameter are not particularly limited. The phrase "the water-insoluble colorant has a crystalline structure" used in the present invention means that when the water-insoluble colorant in a dispersion is subjected to a powder X-ray diffraction analysis, the results of analysis do not meet any one of the following (i) and (ii):

(i) A halo that is specific to amorphous (non-crystalline) substance is observed.

(ii) The crystallite diameter that is determined by the measuring method described below is less than 20 Å, or the substance is supposed to be amorphous.

In the present invention, the crystallite diameter is measured and calculated as follows:

First, X-ray diffraction analysis is performed by using Cu-Kα1 ray. Thereafter, in the range 2θ of 4 deg to 70 deg, a half width of the peak that shows the maximum intensity, or the peak that shows a sufficiently large intensity to be able to separate from a peak adjacent thereto, is measured. Then, the crystallite diameter is calculated according to the following Scherrer's equation:

$$D=K \times \lambda/(\beta \times \cos \theta)$$

wherein, D represents a crystallite diameter (Å, a size of crystallite), λ represents a measuring X-ray wavelength (Å), β represents an extent (radian) of a diffraction line dependent on a diameter of the crystal, θ represents a Bragg angle (radian) of the diffraction line, and K represents a constant which is variable depending on the constant of β and the constant of equipment to be used.

Generally, it is known that when a half width $\beta_{1/2}$ is used in place of β, K equals 0.9. Further, since the wavelength of Cu-Kα1 ray is 1.54050 Å, the crystallite diameter D in the present invention is calculated according to the following equation:

$$D=0.9 \times 1.54050/(\beta_{1/2} \times \cos \theta)$$

In this case, when a peak of the spectrum obtained by the measurement is so broad that a half width of the spectrum is difficult to make out, it is assumed that the crystallite diameter is less than 20 Å (a micro crystalline state), or an amorphous state (non-crystalline).

In the dispersion of the present invention, the water-insoluble colorant has a crystalline structure. The crystallite diameter of the crystalline structure is preferably from 20 Å to 500 Å, and more preferably 20 Å or more, but less than 400 Å. It is especially preferable that the crystallite diameter is 20 Å or more, but less than 350 Å, from a viewpoint of reconciling resistance to light with transparency. Further, it is especially preferable that the water-insoluble colorant has a crystallite diameter close to the particle size thereof in order to attain a high resistance to light while maintaining transparency of the dispersion.

In the dispersion of the present invention, particles containing the water-insoluble colorant are dispersed in a medium containing water. In one embodiment, when a peak intensity of light absorbance in the visible light wavelength region (for example, about 380 nm to about 700 nm) is 1, the light-scattering intensity is 30,000 cps or less. This means that even though the particles contain the water-insoluble colorant in such an amount that a peak intensity of light absorbance in the visible light wavelength region becomes 1, the light-scattering intensity is as low as 30,000 cps or less. When the light-scattering intensity is low, high transparency can be recognized in the above dispersion, or a recording liquid in which the dispersion is used. In the conventional pigment ink, when a peak intensity of light absorbance in the visible light wavelength region is 1, the light-scattering intensity is in the range of about 150,000 cps to about 250,000 cps, for example, in the case where an average particle size of the pigment colorant in the ink is about 150 nm. For this reason, high visible transparency is understood.

In the present invention, gases such as air or oxygen may coexist at the time of generation of particles. For example, these gases may be used as an oxidant. The embodiment of making the gases coexist is not particularly limited. For example, the gases may be dissolved in a liquid of the water-insoluble colorant and/or an aqueous medium in advance. Alternatively, the gases may be introduced into another medium different from these liquids, and followed by contacting said another medium with these liquids.

In the aqueous dispersion of the present invention, a mixture having particles of the water-insoluble colorant generated is subjected to an acid treatment that is specifically described below. Preferably, in the acid treatment, the acid is added during formation of aggregate, to form aggregate of particles. The acid-using treatment preferably includes steps of aggregation of pigment particles with an acid, separation of the resultant aggregate from a solvent (dispersing medium), concentration, solvent removal and desalting (deacidification). By making a system acidic, it enables to reduce electrostatic repulsion of particles owing to a hydrophilic portion of the acid, and to aggregate the pigment particles.

As the acid that is used in the aggregation of particles, any acid may be used so long as the compound is able to make hardly precipitating fine-particles in the aqueous dispersion aggregate in a form such as slurry, paste, powder-like, granular, cake-like (bulk), sheet-like, short (discontinuous) fiber-like or flake-like form, and able to efficiently separate the resultant aggregate from a solvent according to an ordinary separation method. As the acid, it is preferred to use an acid that forms a water-soluble salt with alkali. It is more preferable that the acid itself has a high solubility to water. In order to conduct desalting as efficiently as possible, it is preferable that the amount of acid used is as small as possible so long as the aqueous dispersion of the pigment particles aggregate in the amount of the acid. Examples of the acid include hydrochloric acid, sulfuric acid, nitric acid, acetic acid, phosphoric acid, trifluoroacetic acid, dichloroacetic acid, and methane sulfonic acid. Of these acids, hydrochloric acid, acetic acid, and sulfuric acid are particularly preferable. An aqueous dispersion of pigment particles that has been processed with the acid so as to be easily separable can be easily separated by using a centrifugal separator, a filter, a slurry liquid-solid separator or the like. At this time, a degree of desalting or solvent removal can be controlled by adding diluent water, or by increasing frequency of decantation and washing.

The thus-obtained aggregate can be used as a paste or slurry as it is, each of which has high water content. If necessary, it is also possible to use fine powder that is obtained by drying the paste or slurry according to a drying method such as a spray-dry method, centrifugal separation drying method, a filter drying method, or a freeze-drying method.

In the aqueous dispersion of the present invention, a water-insoluble colorant has a crystalline structure. It is preferable to wash a soft aggregate with an organic solvent, in order to form the crystalline structure. As the organic solvent, ester series solvents, ketone series solvents, alcoholic solvents, aromatic solvents and aliphatic solvents are preferable. Ester series solvents and ketone series solvents are more preferable. Ester series solvents are especially preferable.

Examples of the ester series solvents include ethyl acetate, ethyl lactate, and 2-(1-methoxy)propyl acetate. Examples of the ketone series solvents include acetone, methyl ethyl ketone, methyl isobutyl ketone, and cyclohexanone. Examples of the alcoholic solvents include methanol, ethanol, and n-butanol. Examples of the aromatic solvents include benzene, toluene, and xylene. Examples of the aliphatic solvents include n-hexane and cyclohexane. Ethyl acetate, acetone, and ethyl lactate are preferable. Among them, acetone and ethyl lactate are particularly preferable.

In the washing treatment, the amount of the organic solvent used is not particularly limited, but it is preferred to use the organic solvent in the proportion of 0.01 parts by mass to 10,000 parts by mass with respect to 100 parts by mass of the pigment. The amount of the organic solvent (i.e. crystallizing and washing organic solvent) that is contained in the aqueous dispersion of the present invention is not particularly limited, but it is practical that the proportion of the organic solvent is in the range of 0.0001% by mass to 1% by mass.

A method of making the obtained aggregate come into contact with the above organic solvent is not particularly limited, but it is preferred to use a method in which after contact of the aggregate with the organic solvent, they can be separated from each other. Further, as exemplified by filtration through a filter, a method in which the organic solvent can be separated as a liquid per se at the time of separation is preferable.

Even though the reason is not definite, a contact treatment with the above organic solvent in the present invention enables to make a crystallite diameter increase without increasing a particle size of the water-insoluble colorant. Namely, it is possible to enhance crystallinity of the water-insoluble colorant while maintaining a primary particle size of the water-insoluble colorant at the time of deposition. As a result, high dispersion stability is also maintained. Further, in the re-dispersion treatment that is described below, it is also possible to re-disperse particles of the water-insoluble colorant into water or the like while maintaining a primary particle size of the water-insoluble colorant at the time of deposition. As a result, high dispersion stability is also maintained. Further, the viscosity can be kept at a low level by the re-dispersion treatment even in enrichment of the re-dispersion of the aggregate. Further, the dispersion of the present invention, when used as an inkjet recording liquid, has an excellent discharge (emission) property. It is assumed that the above functions could be developed by making the dispersion come into contact with the organic solvent, and thereafter separating one from another, thereby to isolate and remove an excessive dispersing agent that is contained in the dispersion.

At this time, a dispersing agent that is present at the neighbor of the surface of particles of the water-insoluble colorant in the dispersion of the present invention has been fixed solidly on the particles of the water-insoluble colorant. Therefore, the particle size of the water-insoluble colorant does not increase. As a result, even after the re-dispersion treatment that is described below, high dispersion stability is maintained while maintaining a primary particle size of the water-insoluble colorant at the time of deposition.

In the dispersion of the present invention, it is preferred to re-disperse the soft aggregate. As the re-dispersion treatment, there can be exemplified an alkali treatment. Namely, it is preferred to neutralize the particles aggregated with using the acid, with alkali, and then to re-disperse the particles into water or the like with maintenance of a primary particle size at the time of deposition of the particles. Since desalting and solvent removal have been already conducted, a concentrated-base of aqueous dispersion containing a little impurity can be obtained. As the alkali used herein, any alkali can be used, so long as they act as a neutralizing agent for a dispersing agent having an acidic hydrophilic portion and enhance solubility to water. Specific examples of the alkali include various kinds of organic amines such as aminomethylpropanol, dimethylaminopropanol, dimethylethanolamine, ditehyltriamine, monoethanolamine, diethanolamine, triethanolamine, butyldiethanolamine, and morpholine; alkali metal hydroxides such as sodium hydroxide, lithium hydroxide, and potassium hydroxide; and ammonia. They may be used solely or in a combination of two or more compounds.

The amount of the alkali used is not particularly limited within the range in which the aggregated particles can be re-dispersed stably in water. However, when the dispersion is used for end use such as a printing ink or inkjet printer ink, the alkali sometimes causes corrosion of various kinds of parts. Therefore, it is preferred to use the alkali in such an amount that pH is within the range of 6 to 12, and more preferably from 7 to 11.

Further, in accordance with the dispersing agent that is used in the time of deposition of particles, a method different from the above alkali treatment may be used. Examples of the method include a re-dispersion treatment using a low molecular dispersing agent or polymer dispersing agent described above. At this time, means for a dispersion treatment that are known from the past may be used. For example, it is possible to use a dispersing machine such as sand mill, bead mill, ball mill, and Disolver, or an ultrasonic treatment. These re-dispersion treatments may be used in combination with the above alkali treatment.

When the aggregated particles are re-dispersed, re-dispersion can be easily performed by adding a water-soluble organic solvent as a medium for the re-dispersion. The organic solvent used is not particularly limited. Specific examples of the organic solvent include lower alcohols such as methanol, ethanol, n-propanol, isopropanol, n-butanol, isobutanol, and tert-butanol; aliphatic ketones such as acetone, methylethylketone, methylisobutylketone, and diacetone alcohol; ethylene glycol, diethylene glycol, triethylene glycol, glycerol, propylene glycol, ethylene glycol monomethyl or monoethyl ether, propylene glycol monomethyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, N-methylpyrrolidone, 2-pyrrolidone, N,N-dimethylformamide, dimethylimidazolidinone, dimethylsulfoxide, and N,N-dimethylacetoamide. These solvents may be used singly or in a combination of two or more compounds. When pigments are re-dispersed to prepare an aqueous dispersion thereof, the water content is preferably in the range of 99 to 20% by mass and, more preferably from 99 to 20% by mass of the aqueous dispersion respectively. The content of the organic solvent is preferably in the range of 50 to 0.1% by mass and, more preferably from 30 to 0.05% by mass of the aqueous dispersion respectively.

When water, the above-described alkali and water-soluble organic solvent are added to the aggregated particles, if necessary, a stirrer, a mixer and a dispersing machine may be used. When a paste or slurry of organic pigments which is high in water content is used, addition of water is unnecessary. Further, heating, cooling, distillation or the like may be conducted for the purpose of enhancing efficiency of re-dispersion and another purpose of removing unnecessary water-soluble organic solvent, or an excessive alkali or the like.

The recording liquid of the present invention may be prepared by using the above dispersion of the present invention, and mixing the dispersion with each of prescribed components such as a polymer compound, a surfactant and an aqueous solvent, and then uniformly dissolving or dispersing them. It is preferable that the recording liquid of the present invention contains the above water-insoluble colorant in an amount of 0.1% by mass to 15% by mass of the recording liquid. When an excessive amount of polymer compounds or other additives are contained in the prepared ink, these materials may be properly removed according to a method such as centrifugal separation and dialysis, thereby to re-prepare the ink composition. The recording liquid of the present invention may be used alone. Alternatively, the recording liquid may be combined with another ink to prepare an ink set of the present invention.

The recording liquid of the present invention may be used in various image-forming methods and apparatuses, such as a variety of printing methods, inkjet process, and electrophotography. Imaging can be performed according to an image-forming method using the apparatuses. Further, according to the inkjet process, fine patterns may be formed, or dosage of drugs may be conducted.

It is preferable that the recording liquid of the present invention is used as an inkjet recording liquid. It is also preferred to prepare an ink set using the inkjet recording liquid. It is also preferred to prepare a printed article having an image recorded by use of the recording liquid of the present invention and tools that can provide the recording liquid with a recording medium. It is more preferred to prepare a printed article having an image with a shading nuance adjusted by the means that has a function to adjust an applying amount or concentration of the recording liquid. It is also preferable that the recording liquid or ink set is used in an image-forming method that includes a process of recording an image by providing the recording liquid with a medium. Further, according to the present invention, it is also possible to produce an image-forming apparatus having the means for recording an image by using the above recording liquid or ink set and providing the recording liquid with a medium.

When the dispersion of the present invention, which has such excellent properties as described above, is applied to an ink, it is possible to achieve the image-recording with a high density and detail equivalent to the current off-set printing, or letter press printing that reproduce a color tone shading nuance by an area proportion (area gradation) as an example.

The purpose of the present invention is to provide a dispersion of water-insoluble colorants that is able to maintain not only a high resistance to light but also a low viscosity and an excellent dispersibility by suppressing undesired aggregation of fine pigment particles in a dispersion liquid of build-up pigments having a fine and uniform particle size, and also able to adjust the color reproduction gamut in a wide range, and able to suppress a change of color tint over the range of a low density region to a high density region, thereby to achieve a desired tint; and a production method of the dispersion, a recording liquid, ink set, printed articles, an image-forming method and an image-forming apparatus each using the dispersion.

In the dispersion of the present invention, even though particles of the water-insoluble colorant are fined to nanometer size, aggregation of the particles is suppressed so that a low viscosity and excellent dispersibility is maintained. Further, the dispersion of the present invention shows a high resistance to light, and has a developed color in the color reproduction gamut that is not obtained by a single pigment species, or a simple mixture of two or more pigment species. Further, the dispersion of the present invention provides such excellent effects that a difference in color tint between a low density region and a high density region can be reduced not only in the case where a shading nuance of the printed article is adjusted by an injection amount of ink as exemplified by the inkjet recording process, but also in the case of using a printing process that employs means for adjusting with a concentration or thickness of a recording liquid.

According to the production method of the present invention, it is possible to produce the dispersion having the above excellent properties with a good efficiency in high purity.

According to the image-forming method and the image-forming apparatus of the present invention, it is possible to form an image with a high precision by using the recording liquid.

The present invention will be described in more detail based on the following examples, but the invention is not intended to be limited thereto. In the following examples, the terms "part(s)" and "%" are values by mass, unless otherwise specified.

Average particle size of each of the dispersion s according to the dynamic scattering method is measured by using Microtrac (Version 10.1.2-211 BH, manufactured by NIKKISO CO., LTD.) after dilution with ion-exchanged water. At this time, in addition to a volume-average particle size Mv of each of the dispersions, a number-average particle size Mn thereof is measured. Further, evaluation of the average particle size from observation of the transmission electron microscope (TEM) was conducted by dropping a diluted dispersion onto a Cu 200 mesh to which a carbon film is attached, and then dried, and thereafter measuring the size (width of particle cross section) of each of 300 particles that are isolated and not piled, from images of the particles photographed to 100,000 times using TEM (1200EX, manufactured by JEOL Ltd.), thereby calculating an average value as an average particle size. Hereinafter, the average particle size calculated from TEM observation is described as a TEM average particle size.

EXAMPLES

Example 1

1.45 parts by mass of C.I. pigment red 122, 1.55 parts by mass of C.I. pigment violet 19, and 6 parts by mass of polyvinyl pyrrolidone K25 (trade name, manufactured by TOKYO KASEI KOGYO CO., LTD.) were added to 100 parts by mass of dimethylsulfoxide at room temperature and stirred for 2 hours, and allowed to suspend. Thereafter, to the suspension, 28% sodium methoxide methanol solution, (a product of Wako Pure Chemical Industries) was added gradually to dissolve the pigments. Thereby a deep blue-violet colored pigment solution was obtained.

The resultant pigment solution was subjected to an ultrasonic treatment, and thereafter rapidly injected through a syringe to 500 parts by mass of ion-exchanged water while stirring with a stirrer. Resultantly; a transparent and red-tinted pigment dispersion was obtained. A number-average particle size of the pigment dispersion measured according to the dynamic light-scattering method was 27.2 nm (TEM average particle size: 30.2 nm). A ratio of {a volume-average particle size (Mv)}/{a number-average particle size (Mn)}, which is an indicator of mono dispersion property, was 1.23.

Subsequently, hydrochloric acid was added drop-wise to the resultant dispersion to adjust pH to 3.5. Thereby pigment particles were aggregated from the dispersion. Thereafter, the thus-obtained aggregate was filtrated under reduced pressure by using a membrane filter (average pore size 0.2 μm), and then washed twice with ion-exchanged water. Thereby a paste of dispersion containing desalted and solvent-removed pigment particles was obtained.

Subsequently, 100 parts by mass of ethyl lactate was added to the resultant paste and washed. The resultant liquid was stirred and subjected to an ultrasonic treatment. Thereafter, the thus-obtained aggregate was filtrated under reduced pressure by using a membrane filter (average pore size 0.2 μm), thereby a paste of dispersion containing pigment particles was obtained. The resultant paste was washed with ion-exchanged water and filtrated again under reduced pressure by using a membrane filter (average pore size 0.2 μm), thereby a paste A of dispersion containing pigment particles was obtained.

Subsequently, 0.3 parts by mass of sodium oleate was added to 3 parts by mass of the paste A, additional ion-exchanged water was added so that a content of the pigment was 10% with respect to the paste. The resultant was subjected to an ultrasonic treatment. Thus, pigment dispersion A was obtained. A number-average particle size of the pigment dispersion A measured according to the dynamic light-scattering method was 28.4 nm (TEM average particle size: 30.4 nm). A change of the particle size after storage for 2 weeks was not observed. Further, no precipitate was found.

Example 2

Pigment dispersion B having a pigment content of 10% was obtained in the same manner as in Example 1, except that the pigments were changed to 2.0 parts by mass of C.I. pigment red 122, and 1.0 part by mass of C.I. pigment violet 19 respectively. A number-average particle size of the pigment dispersion B measured according to the dynamic light-scattering method was 30.6 nm (TEM average particle size: 31.3 nm). A change of the particle size after storage for 2 weeks was not observed. Further, no precipitate was found.

Example 3

Pigment dispersion C having a pigment content of 10% was obtained in the same manner as in Example 1, except that the pigments were changed to 1.0 part by mass of C.I. pigment red 122, and 2.0 parts by mass of C.I. pigment violet 19 respectively. A number-average particle size of the pigment dispersion C measured according to the dynamic light-scattering method was 32.7 nm (TEM average particle size: 33.6 nm). A change of the particle size after storage for 2 weeks was not observed. Further, no precipitate was found.

Comparative Example 1

1.45 parts by mass of C.I. pigment red 122, 1.55 parts by mass of C.I. pigment violet 19, and 5 parts by mass of a copolymer of methylmethacrylate/ethylacrylate/acrylic acid (5/4/1 in molar ratio) (acid number: 60, molecular weight: 32000) as a dispersing agent were added to 100 parts by mass of dimethylsulfoxide at room temperature and stirred for 2 hours, and allowed to suspend. Thereafter, to the suspension, a 28% sodium methoxide methanol solution (a product of Wako Pure Chemical Industries) was added gradually to dissolve the pigments. Thereby a deep blue-violet colored pigment solution was obtained.

The resultant pigment solution was subjected to an ultrasonic treatment, and thereafter rapidly introduced by using a syringe to 500 parts by mass of ion-exchanged water while stirring with a stirrer. Resultantly, a transparent and reddish pigment dispersion was obtained. A number-average particle size of the pigment dispersion measured according to the dynamic light-scattering method was 40.2 nm (TEM average particle size: 39.2 nm). A ratio of {volume-average particle size (Mv)}/{number-average particle size (Mn)}, which is an indicator of mono dispersion property, was 1.33. The resultant dispersion was heated up to 90° C. at inner temperature and stood at 90° C. for 2 hours, and thereafter cooled down to room temperature.

Subsequently, hydrochloric acid was added drop-wise to the resultant pigment dispersion to adjust pH to 3.5. Thereby pigment particles were aggregated from the dispersion. Thereafter, the thus-obtained aggregate was filtrated under reduced pressure by using a membrane filter (average pore size 0.2 μm), and then washed twice with ion-exchanged water. Thereby a paste of dispersion containing desalted and solvent-removed pigment particles was obtained.

Subsequently, potassium hydroxide was added to the paste, and then ion-exchanged water was added and stirred for 1 hour. Thereafter, an additional amount of ion-exchanged water was added so that a content of the pigment was 10% with respect to the paste. Further, potassium hydroxide was added to adjust pH to 9.5. Thereby a pigment dispersion D was obtained. A number-average particle size of the pigment dispersion D measured according to the dynamic light-scattering method was 40.9 nm (TEM average particle size: 42.4 nm). A change of the particle size after storage for 2 weeks was not observed. Further, no precipitate was found.

Comparative Example 2

Dispersion was obtained in the same manner as in Example 1, except that polyvinyl pyrrolidone used in Example 1 was omitted. As soon as a pigment solution was injected through a syringe, the solution turned to a red suspension. As a result, a transparent dispersion solution was not obtained. A precipitate was found. Thereafter, the precipitate was filtrated under reduced pressure by using a membrane filter (average pore size 0.2 μm), and then washed twice with ion-exchanged water. Thereby a desalted and solvent-removed paste was obtained. 20 parts by mass of the thus-obtained paste, 1.3 parts by mass of sodium oleate, and 78.7 parts by mass of ion-exchanged water were mixed and dispersed for 4 hours by using a bead mill to obtain a pigment dispersion E. A number-average particle size of the pigment dispersion E measured according to the dynamic light-scattering method was 79.7 nm (TEM average particle size: 80.8 nm). A ratio of {volume-average particle size (Mv)}/(number-average particle size (Mn)}, which is an indicator of mono dispersion property, was 1.67. A particle size after storage for 2 weeks somewhat increased. However, no precipitate was found.

Comparative Example 3

20 parts by mass of C.I. pigment red 122, 1.3 parts by mass of sodium oleate, and 78.7 parts by mass of ion-exchanged water were mixed and dispersed for 4 hours by using a bead mill to obtain a pigment dispersion F. A number-average particle size of the pigment dispersion F measured according to the dynamic light-scattering method was 80.1 nm (TEM average particle size: 79.2 nm). A ratio of {volume-average particle size (Mv)}/{number-average particle size (Mn)}, which is an indicator of mono dispersion property, was 1.51. A particle size after storage for 2 weeks somewhat increased. However, no precipitate was found.

Comparative Example 4

20 parts by mass of C.I. pigment violet 19, 1.3 parts by mass of sodium oleate, and 78.7 parts by mass of ion-exchanged water were mixed and dispersed for 4 hours by using a bead mill to obtain a pigment dispersion G. A number-average particle size of the pigment dispersion G measured according to the dynamic light-scattering method was 87.5 nm (TEM average particle size: 84.9 nm). A ratio of {volume-average particle size (Mv)}/{number-average particle size (Mn)}, which is an indicator of mono dispersion property, was 1.47. A particle size after storage for 2 weeks somewhat increased. However, no precipitate was found.

(X-Ray Diffraction Measurement)

As described below, X-ray diffraction measurement was conducted by using RINT 2500 (manufactured by Rigaku Industrial Corp.). The pigment dispersions A, D, F, and G were dried by using an evaporator to prepare powder A, D, F, and G, respectively. The powder A, D, F, and G were subjected to X-ray diffraction measurement. Besides, mixing the pigment dispersion F and the pigment dispersion G, a powder Mix F/G were prepared so as to get a mixed powder of 1.45 parts by mass of C.I. pigment red 122 powder and 1.55 parts by mass of C.I. pigment violet 19 powder. The resultant powder mix was subjected to X-ray diffraction measurement. Spectra obtained by these measurements are shown in FIG. 1 and FIG. 2.

As shown in FIG. 1, a crystal form of the powder A from the pigment dispersion A is different from that of either C.I. pigment red 122 powder F or C.I. pigment violet 19 powder G. Further, the crystal form of the powder A is also different from that of the powder Mix F/G that is a simple mixture of a powder F and a powder G. From these results, it is understood that pigment particles of the dispersion A has a different crystal form from a simple mixture of two kinds of raw pigments.

Figure 2:
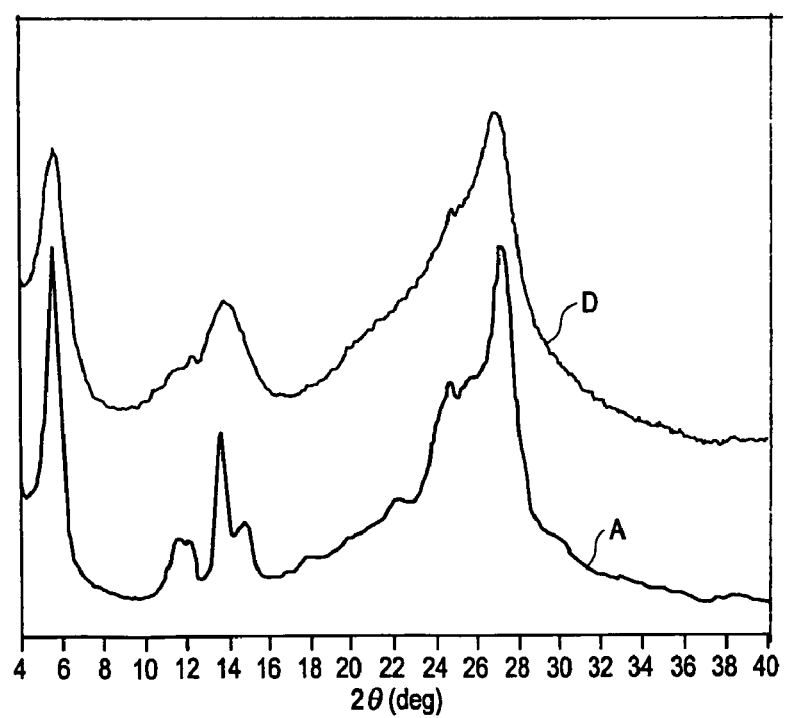
FIG. 2 is X-ray diffraction charts of powders of pigment particles obtained from Examples and Comparative Examples.

Further, as shown in FIG. 2, a halo is observed in the 2θ range of 10 deg to 40 deg of the X-ray diffraction in the spectrum of the powder D. From the spectrum, it is understood that the pigment particles are in the amorphous state, or fine crystal state.

Further, with respect to the powder A of pigment particles contained in the pigment dispersion prepared in Example 1, X-ray diffraction measurement was conducted to calculate a crystallite diameter. As a result, the crystallite diameter was 151±50 Å. The X-ray diffraction measurement was conducted by using Cu target and Cu-Kλ1. Likewise, the X-ray diffraction measurement was conducted with respect to the powder B and C of pigment particles contained in the pigment dispersion prepared in Examples 2 and 3. The crystallite diameters were 198±50 Å and 191±50 Å respectively. Thus, the pigment particles contained in the pigment dispersion liquid prepared in Examples 1 to 3 have a crystalline structure.

(Preparation of Ink Composition)

Examples 1a to 3a)

50 parts by mass of each of the pigment dispersions A to C was mixed with 7.5 parts by mass of diethylene glycol, 5 parts by mass of glycerol, 5 parts by mass trimethylolpropane, 0.2 parts by mass of Acetyrenol EH (trade name, manufactured by Kawaken Fine Chemical Co., Ltd.), and 32.3 parts by mass of ion-exchanged water to each obtain ink compositions A to C.

Comparative Examples 1a to 4a

Each of the pigment dispersions D to G was diluted with ion-exchanged water so as to get a concentrated liquid each having a pigment content of 10% by mass. 50 parts by mass of each of the concentrated solutions was mixed with 7.5 parts by mass of diethylene glycol, 5 parts by mass of glycerol, 5 parts by mass of trimethylolpropane, 0.2 parts by mass of Acetyrenol EH, and 32.3 parts by mass of ion-exchanged water. Thereafter, the resultant mixture was subjected to an ultrasonic treatment to each obtain ink compositions D to G.
[Evaluation of Photoabsorption Spectrum]

Figure 3:
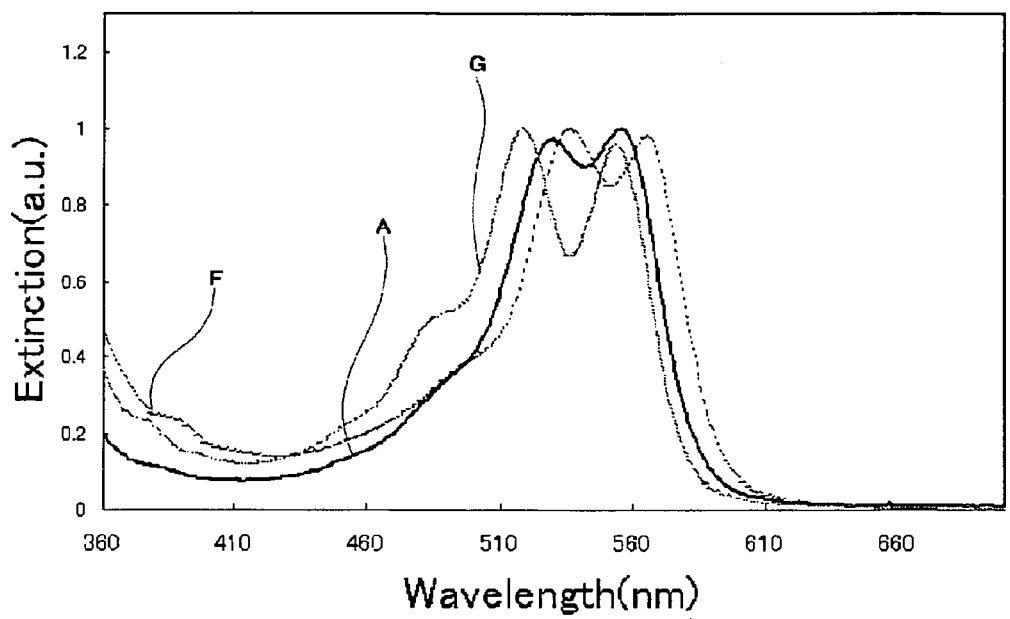
FIG. 3 is absorption spectra of pigment dispersions obtained from Examples and Comparative Examples.

A photoabsorption spectrum of each of the thus-obtained ink compositions A, F and G was measured in the visible light wavelength region by using a cell having an optical path length of 1 cm. FIG. 3 shows photoabsorption spectra each of which was normalized so that the maximum of each of the measured photoabsorption spectrum is 1 in the wavelength region of 360 nm to 800 nm.

As demonstrated in FIG. 3, the ink composition A obtained from the pigment dispersion prepared in Example 1 showed a spectrum having a peak in the wavelength region that is different from those of the ink composition F obtained from the dispersion of C.I. pigment red 122 prepared in Comparative Example 3 and the ink composition G obtained from the dispersion of C.I. pigment violet 19 prepared in Comparative Example 4. Further noticeably, it is seen that in the absorption spectrum of the ink composition A, the absorption at a high energy side, namely an absorption that contributes color gamut of the yellow-tinted component is less than those of the ink composition F and the ink composition G.
[Evaluation of Color Reproduction]

Subsequently, in order to evaluate a color reproduction, an ink composition was printed on a medium having a coating layer, and then a* value and b* value each standardized in CIE were measured.

Specifically, each of the ink compositions A to C, F and G was charged in an inkjet printer PXG930 (manufactured by Seiko-Epson), and then printed on Premium Glossy Photo Paper (manufactured by Seiko-Epson) as an example of the medium having a coating layer to obtain a recorded matter. A patch was printed varying an application amount in the range of 200% to 0%. The printed matter was dried in air for 24 hours. Thereafter, L* value, a* value and b* value each standardized in CIE were measured. For measurement, Gretag Spectrolino (trade name, manufactured by Gretag Co.) was used. The obtained results are shown in Table 4.

Figure 4:
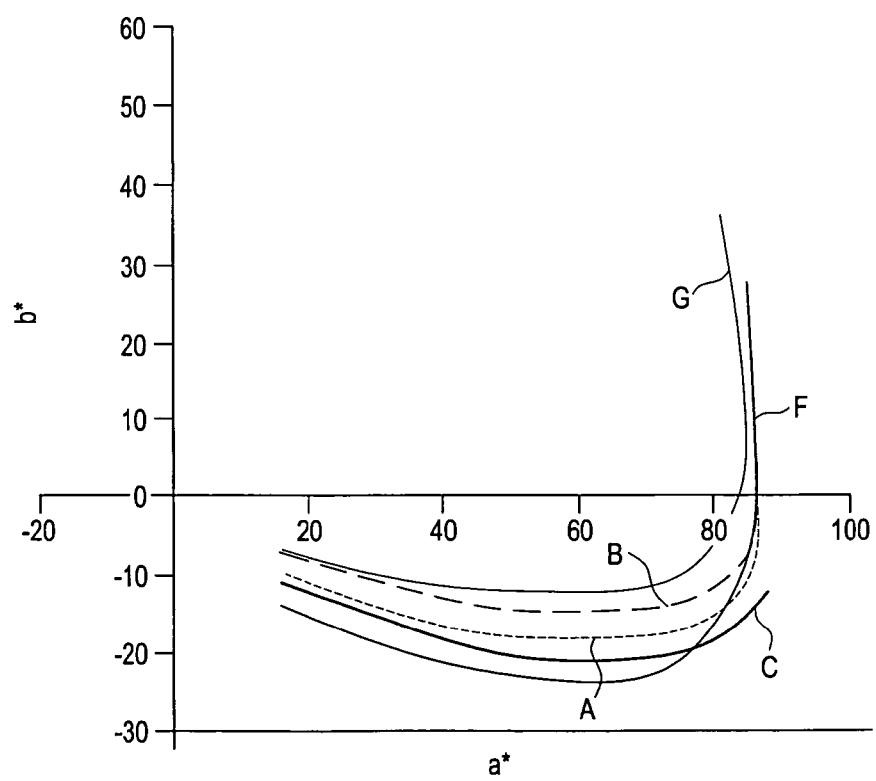
FIG. 4 is a graph showing measurement results of a* values and b* values, each of which is standardized in CIE, of ink compositions obtained from Examples and Comparative Examples.

As demonstrated in FIG. 4, the ink compositions A, B, and C obtained from the pigment liquid prepared in Examples 1 to 3 each showed color development of the color gamut different from those of the ink compositions F and G each prepared using one pigment. In addition, it is seen that, in the ink compositions A, B, and C, the yellow-tinted component (b* value) in the high density region of the printed matter is suppressed at an extremely low level rather than it is increased as in the ink compositions F and B.
[Evaluation of Light Fastness]

A light fastness test was performed in such a manner and conditions that the ink composition A was spin coated on a glass substrate, and the resultant coating was set in a fade meter and irradiated by a xenon lamp with illuminance of 170,000 lux for 4 days. As a UV filter, there was disposed a TEMPAX filter (trade name, manufactured by Eagle Engineering; quality of material: TEMPAX glass (trade name, manufactured by SCHOTT)) between a light source and the sample. The following is the test results of the ink composition A.
Absorbance (Abs.) before irradiation: 0.384
Absorbance after irradiation: 0.328
Residual rate of absorbance {(Absorbance after irradiation)/ (Absorbance before irradiation)×100}: 85.4%

A fade test was performed in the same manner as the above, except that the ink composition D was spin coated on a glass substrate. The residual rate of absorbance of the ink composition D was 68.5%. From these results, it is understood that light fastness of the ink can be remarkably improved by the present invention.

Example 4

1.0 part by mass of C.I. pigment yellow 128, 2.0 parts by mass of C.I. pigment yellow 74, and 5 parts by mass of a copolymer of methylmethacrylate/ethylacrylate/acrylic acid (5/4/1 in molar ratio) (acid number: 60, molecular weight: 32000) as a dispersing agent were added to 100 parts by mass of dimethylsulfoxide at room temperature and stirred for 2 hours, and allowed to suspend. Subsequently, a 28% sodium methoxide methanol solution (manufactured by Wako Pure Chemical Industries) was gradually added to dissolve the pigments, thereby to obtain a red pigment solution.

The resultant pigment solution was subjected to an ultrasonic treatment, and thereafter rapidly injected through a syringe to 500 parts by mass of ion-exchanged water while stirring with a stirrer. Resultantly, a transparent and yellow-tinted pigment dispersion was obtained. A number-average particle size of the pigment dispersion measured according to the dynamic light-scattering method was 28.4 nm (TEM average particle size: 31.5 nm). A ratio of {volume-average particle size (Mv)/{number-average particle size (Mn)}, which is an indicator of mono dispersion property, was 1.34.

Subsequently, hydrochloric acid was added drop-wise to the resultant dispersion to adjust pH to 3.5. Thereby pigment particles were aggregated from the dispersion. Thereafter, the thus-obtained aggregate was filtrated under reduced pressure by using a membrane filter (average pore size 0.2 μm), and then washed twice with ion-exchanged water. Thereby a paste of dispersion containing desalted and solvent-removed pigment particles was obtained.

Further, the paste to which 100 parts by mass of ethyl lactate had been added was washed and followed by agitation and ultrasonic treatment. Thereafter, the resultant paste was filtrated under reduced pressure through a membrane filter having an average pore size of 0.2 μm. The paste was washed with ion-exchanged water, and then filtrated again under reduced pressure through a membrane filter having an average pore size of 0.2 μm, thereby to obtain a paste H of dispersion containing pigment particles.

Subsequently, potassium hydroxide was added to the paste H, and then ion-exchanged water was added and stirred for 1 hour. Thereafter, an additional amount of ion-exchanged water was added so that a content of the pigment was 10% with respect to the paste. Further, potassium hydroxide was added to adjust pH to 9.5. Thereby a pigment dispersion H was obtained. A number-average particle size of the pigment dispersion H measured according to the dynamic light-scattering method was 29.8 nm (TEM average particle size: 31.6 nm). A change of the particle size after storage for 2 weeks was not observed. Further, neither precipitation nor discoloration was also observed.

Example 5

2.0 parts by mass of C.I. pigment yellow 128, 2.0 parts by mass of C.I. pigment yellow 74, and 6 parts by mass of polyvinyl pyrrolidone K25 (trade name, manufactured by TOKYO KASEI KOGYO CO., LTD.) were added to 100 parts by mass of dimethylsulfoxide at room temperature and stirred for 2 hours, and allowed to suspend. Subsequently, a 28% sodium methoxide methanol solution (manufactured by Wako Pure Chemical Industries) was gradually added to dissolve the pigments, thereby to obtain a red pigment solution.

The resultant pigment solution was subjected to an ultrasonic treatment, and thereafter rapidly injected through a syringe to 500 parts by mass of ion-exchanged water while stirring with a stirrer. Resultantly, a transparent and yellow-tinted pigment dispersion was obtained. A number-average particle size of the pigment dispersion measured according to the dynamic light-scattering method was 38.4 nm (TEM average particle size: 39.1 nm). A ratio of {volume-average particle size (Mv)/{number-average particle size (Mn)}, which is an indicator of mono dispersion property, was 1.25.

Subsequently, hydrochloric acid was added drop-wise to the resultant dispersion to adjust pH to 3.5. Thereby pigment particles were aggregated from the dispersion. Thereafter, the thus-obtained aggregate was filtrated under reduced pressure by using a membrane filter (average pore size 0.2 μm), and then washed twice with ion-exchanged water. Thereby a paste of dispersion containing desalted and solvent-removed pigment particles was obtained.

Further, the paste to which 100 parts by mass of ethyl lactate had been added was washed and followed by agitation and ultrasonic treatment. Thereafter, the resultant paste was filtrated under reduced pressure through a membrane filter having an average pore size of 0.2 μm. The paste was washed with ion-exchanged water, and then filtrated again under reduced pressure through a membrane filter having an average pore size of 0.2 μm, thereby to obtain a paste I of a dispersion containing pigment particles.

Subsequently, 0.3 parts by mass of sodium oleate was added to 3 parts by mass of the paste, and then ion-exchanged water was added to the paste so as to become a pigment content of 10%. The resultant paste was subjected to an ultrasonic treatment to obtain a pigment dispersion I. A number average particle size of a dispersion of the pigment dispersion I was 39.8 nm (TEM average particle size: 39.3 nm). No change of average particle size after storage for 2 weeks was observed. Further, neither precipitation nor discoloration was also observed.

Comparative Example 5

1.0 part by mass of C.I. pigment yellow 128, 2.0 parts by mass of C.I. pigment yellow 74, and 5 parts by mass of a copolymer of methylmethacrylate/ethylacrylate/acrylic acid (5/4/1 in molar ratio) (acid number: 60, molecular weight: 32000) as a dispersing agent were added to 100 parts by mass of dimethylsulfoxide at room temperature and stirred for 2 hours, and allowed to suspend. Thereafter, to the suspension, a 28% sodium methoxide methanol solution (a product of Wako Pure Chemical Industries) was added gradually to dissolve the pigments. Thereby a red colored pigment solution was obtained.

The resultant pigment solution was subjected to an ultrasonic treatment, and thereafter rapidly injected through a syringe to 500 parts by mass of ion-exchanged water while stirring with a stirrer. Resultantly, a transparent and yellow-tinted pigment dispersion was obtained. A number-average particle size of the pigment dispersion measured according to the dynamic light-scattering method was 38.4 nm (TEM average particle size: 39.3 nm). A ratio of {volume-average particle size (Mv)/{number-average particle size (Mn)}, which is an indicator of mono dispersion property, was 1.35. The resultant dispersion was heated up to 90° C. at inner temperature and stood at 90° C. for 2 hours, and thereafter cooled down to room temperature.

Subsequently, hydrochloric acid was added drop-wise to the resultant dispersion to adjust pH to 3.5. Thereby pigment particles were aggregated from the dispersion. Thereafter, the thus-obtained aggregate was filtrated under reduced pressure by using a membrane filter (average pore size 0.2 μm), and then washed twice with ion-exchanged water. Thereby a paste J of dispersion containing desalted and solvent-removed pigment particles was obtained.

Subsequently, potassium hydroxide was added to the paste J, and then ion-exchanged water was added and stirred for 1 hour. Thereafter, an additional amount of ion-exchanged water was added so that a content of the pigment was 10% with respect to the paste. Further, potassium hydroxide was added to adjust pH to 9.5. Thereby a pigment dispersion D was obtained. A number-average particle size of the pigment dispersion D measured according to the dynamic light-scattering method was 42.1 nm (TEM average particle size: 42.8 nm). A change of the particle size after storage for 2 weeks was not observed. Further, no precipitate was found.

Comparative Example 6

1.0 part by mass of C.I. pigment yellow 128, 2.0 parts by mass of C.I. pigment yellow 74, and 5 parts by mass of a copolymer of methylmethacrylate/ethylacrylate/acrylic acid (5/4/1 in molar ratio) (acid number: 60, molecular weight: 32000) as a dispersing agent were added to 100 parts by mass of dimethylsulfoxide at room temperature and stirred for 2 hours, and allowed to suspend. Thereafter, to the suspension, a 28% sodium methoxide methanol solution (a product of Wako Pure Chemical Industries) was added gradually to dissolve the pigments. Thereby a red-purple colored pigment solution was obtained.

The resultant pigment solution was subjected to an ultrasonic treatment, and thereafter rapidly injected through a syringe to 500 parts by mass of ion-exchanged water while stirring with a stirrer. Resultantly, a transparent and yellow-tinted pigment dispersion K was obtained. A number-average particle size of the pigment dispersion K measured according to the dynamic light-scattering method was 33.7 nm (TEM average particle size: 35.1 nm). A ratio of {volume-average particle size (Mv)}/{number-average particle size (Mn)}, which is an indicator of mono dispersion property, was 1.38. The resultant dispersion was heated up to 90° C. at inner temperature and stood at 90° C. for 2 hours, and thereafter cooled down to room temperature. The pigment dispersion was allowed to stand for 1 week. After that, discoloration was observed visibly.

(X-Ray Diffraction Measurement)

RINT 2500 (manufactured by Rigaku Industrial Corp.) was used in order to conduct the X-ray diffraction measurement described below.

Pastes H, I and J, i.e., pastes of dispersions, were dried by using an evaporator to prepare a powder of respective paste. The powder of respective paste was subjected to X-ray diffraction measurement. As a result, crystallite diameters of the pigment particles each contained in the pastes H and I were 208±50 Å, and 232±50 Å, respectively. In the spectrum of the paste J, a halo was observed in the 2θ range of 4 deg to 70 deg. Thus, the pigment particles contained in the pigment dispersion prepared in Examples 4 and 5 had a crystalline structure.

(Preparation of Ink Composition)

50 parts by mass of the pigment dispersion H was mixed with 7.5 parts by mass of diethylene glycol, 5 parts by mass of glycerol, 5 parts by mass of trimethylolpropane, 0.2 parts by mass of Acetyrenol EH, and 32.3 parts by mass of ion-exchanged water to obtain ink composition H. Similarly, ink compositions I and J were obtained by using the pigment dispersions I and J.

[Evaluation of Light Fastness]

A light fastness test was performed in such a manner and conditions that the ink composition H was spin coated on a glass substrate, and the resultant coating was set in a fade meter and irradiated by a xenon lamp with illuminance of 170,000 lux for 4 days. As a UV filter, there was disposed a TEMPAX filter (trade name, manufactured by Eagle Engineering; quality of material: TEMPAX glass (trade name, manufactured by SCHOTT)) between a light source and the sample. The Residual rate of absorbance {(Absorbance after irradiation)/(Absorbance before irradiation)×100)} of the ink composition H was 82.1%.

The similarly evaluated residual rate of absorbance of each of the ink composition I and J was 84.9% and 63.8%, respectively. From these results, it is understood that the ink compositions H and I prepared by the dispersions of the present invention show remarkable high light fastness.

[Scattering Intensity Test]

A scattering intensity test was conducted with respect to the dispersions A to C, H and I of pigment-containing particles obtained by Examples 1 to 5, and the pigment dispersions D, E and J obtained by Comparative Examples 1, 2 and 5. At this time, each of the pigment dispersions was diluted to such a concentration that the absorbance peak value in the visible light region was 1, and then filtrated through a membrane filter with an average pore size of 1.0 μm to conduct the measurement. The scattering intensity is defined as an average cps (counts per second) of 3 minutes measurement that is conducted by using FPAR-1000 (manufactured by OTSUKA ELECTRONICS CO., LTD.) without a ND filter. Besides, a scattering intensity was measured with respect to an aqueous dispersion of polystyrene fine particles having a particle size of 88 nm according to the same measuring method as the above. The scattering intensity was 71792 cps. The results of thus-obtained scattering intensities are shown together with TEM average particle size in Table 1.

TABLE 1

| Sample of Dispersion | Scattering Intensity [cps] | TEM Average Size [nm] |
|---|---|---|
| A (Example 1) | 7791 | 30.4 |
| B (Example 2) | 7875 | 31.3 |
| C (Example 3) | 8113 | 33.6 |
| D (Comparative Example 1) | 7890 | 42.4 |
| E (Comparative Example 2) | 38922 | 80.8 |
| H (Example 4) | 7897 | 31.6 |
| I (Example 5) | 9645 | 39.3 |
| J (Comparative Example 5) | 9901 | 42.8 |

As is apparent from the Table 1, the light-scattering intensity of each of the dispersions obtained by Examples 1 to 5 is 30000 cps or less, provided that the absorbance peak value thereof in the visible light region is 1.

[Evaluation of Transparency]

Evaluation of transparency was performed visibly according to the criterion described below with respect to the ink compositions A to C, H and I each of which used the pigment dispersion obtained by Examples 1 to 5, and the ink compositions D, E and J each of which uses the pigment dispersions obtained by Comparative Examples 1, 2 and 5. Further, each of the above-described ink compositions was coated with a bar coater on a 60 nm thick polyethylene terephthalate (PET) sheet (trade name: PPL/for laser printer (Xerox film OHP FILM), manufactured by Xerox Corporation), and was followed by drying to produce a printed article. Thereafter, the transparency of the printed area was evaluated visibly according to the criterion described below.

2: excellent
1: poor
The results of evaluation are shown in Table 2.

TABLE 2

| Ink Composition | Transparency of Ink Composition | Transparency of Printed Area |
|---|---|---|
| A (Example 1) | 2 | 2 |
| B (Example 2) | 2 | 2 |
| C (Example 3) | 2 | 2 |
| D (Comparative Example 1) | 2 | 2 |
| E (Comparative Example 2) | 1 | 1 |
| H (Example 4) | 2 | 2 |
| I (Example 5) | 2 | 2 |
| J (Comparative Example 5) | 2 | 2 |

As is apparent from the Tables 1 and 2, it is understood that the ink compositions prepared from dispersions having the above-mentioned scattering intensity of 30000 cps or less, and the printed articles printed with the ink compositions have remarkably high transparency.

[Viscosity Measurement of Dispersion]

A viscosity of the pigment dispersion A having a pigment content of 10% that was prepared in Example 1 was measured by using a vibration-type model VM-100A-L (trade name, manufactured by Yamaichi Electronics Co., Ltd.) at 25° C. Further, a viscosity of each of the pigment dispersions B to D and H to J each having a pigment content of 10% was measured in the same manner as mentioned above. Evaluation was performed according to the following criterion:

3: 0.8 to 4.0 mPa·s
2: 4.1 to 10.0 mPa·s
1: higher viscosity than 10.0 mPa·s
The results of evaluation are shown in Table 3.

TABLE 3

| Sample of Dispersion | Viscosity |
|---|---|
| A (Example 1) | 3 |
| B (Example 2) | 3 |
| C (Example 3) | 3 |
| D (Comparative Example 1) | 1 |
| H (Example 4) | 2 |
| I (Example 5) | 3 |
| J (Comparative Example 5) | 1 |

It is understood from the Table 3 that the viscosity of each of the pigment dispersions of the Examples is low, even though these pigment dispersions are of high concentration.

[Evaluation of Discharging Property]

Each of the ink compositions A to D and H to J that were prepared as described above was charged into a cartridge of an inkjet printer PX-G930 (manufactured by Seiko-Epson). Using the inkjet printer, a solid image (reflection density: 1.0) was printed at the whole surface of an inkjet paper (a photographic base paper "Gloss" manufactured by Seiko-Epson) to count numbers of "white streaks" generated during print. Evaluation of discharging property was performed according to the criterion as set below:

3: There is no generation of white streaks (non-printed area) all over the printing surface.
2: Generation of white streaks is slightly observed, which is no problem in practice.
1: Generation of white streaks is frequently observed all over the printing surface, which is not an allowable quality in practice.

The results of evaluation are shown in Table 4.

TABLE 4

| Ink Composition | Discharging Property |
| --- | --- |
| A (Example 1) | 3 |
| B (Example 2) | 3 |
| C (Example 3) | 3 |
| D (Comparative Example 1) | 1 |
| H (Example 4) | 2 |
| I (Example 5) | 3 |
| J (Comparative Example 5) | 1 |

It is understood from the Table 4 that the ink compositions prepared using the pigment dispersions of the Examples are excellent in discharging property.

Comparative Example 6

A dark blue-violet colored pigment solution was obtained in the same manner as in Example 1, except that polyvinyl pyrrolidone was replaced by 5 parts by mass of styrene/methacryric acid (8/2 in molar ratio) copolymer (acid value: 40, molecular weight: 6000).

The resultant pigment solution was subjected to an ultrasonic treatment, and then rapidly introduced using a syringe into 500 parts by mass of ion-exchanged water while stirring with a stirrer. Resultantly, a transparent and red-tinted pigment dispersion was obtained. A number-average particle size of the pigment dispersion was 32.6 nm (TEM average particle size: 34.1 nm). A ratio of {volume-average particle size (Mv)}/{number-average particle size (Mn)}, which is an indicator of mono dispersion property, was 1.33.

Subsequently, hydrochloric acid was added drop-wise to the resultant pigment dispersion to adjust pH to 3.5. Thereby pigment particles were aggregated from the dispersion. Thereafter, the thus-obtained aggregate was filtrated under reduced pressure by using a membrane filter (average pore size 0.2 μm), and then washed twice with ion-exchanged water. Thereby a paste of dispersion containing desalted and solvent-removed pigment particles was obtained.

Subsequently, 100 parts by mass of acetone was added to the paste, and was followed by agitation and an ultrasonic treatment. Thereafter, the resultant paste was filtrated under reduced pressure through a membrane filter (average pore size 0.2 μm) to obtain a pigment powder a.

Example 7

A transparent and red-tinted pigment dispersion was obtained in the same manner as in Example 6, except that the pigments were replaced by 2.0 parts by mass of C.I. pigment red 122 and 1.0 part by mass of C.I. pigment violet 19. A number-average particle size of the pigment dispersion measured according to the dynamic light-scattering method was 35.7 nm (TEM average particle size: 37.7 nm). A ratio of {volume-average particle size (Mv)}/{number-average particle size (Mn)}, which is an indicator of mono dispersion property, was 1.35. Thereafter, a pigment powder b was obtained in the same manner as in Example 6.

Comparative Example 7

A dark blue-violet colored pigment was obtained in the same manner as in Example 1, except that polyvinyl pyrrolidone was replaced by 5 parts by mass of styrene/methacryric acid (8/2 in molar ratio) copolymer (acid value: 40, molecular weight: 6000).

The resultant pigment solution was subjected to an ultrasonic treatment, and then rapidly introduced using a syringe into 500 parts by mass of ion-exchanged water while stirring with a stirrer. Resultantly, a transparent and red-tinted pigment dispersion was obtained. A number-average particle size of the pigment dispersion was 32.4 nm (TEM average particle size: 35.2 nm). A ratio of {volume-average particle size (Mv)}/{number-average particle size (Mn)}, which is an indicator of mono dispersion property, was 1.35. The resultant dispersion was heated up to 90° C. at inner temperature and stood at 90° C. for 2 hours, and thereafter cooled down to room temperature.

Subsequently, hydrochloric acid was added drop-wise to the resultant pigment dispersion to adjust pH to 3.5. Thereby pigment particles were aggregated from the dispersion. Thereafter, the thus-obtained aggregate was filtrated under reduced pressure by using a membrane filter (average pore size 0.2 μm), and then washed twice with ion-exchanged water. Thereby paste C of dispersion containing desalted and solvent-removed pigment particles was obtained.

Comparative Example 8

A pigment paste was prepared in the same manner as in Comparative Example 2, which was designated as a pigment paste d.
(X-Ray Diffraction Measurement)

RINT 2500 (manufactured by Rigaku Industrial Corp.) was used in order to conduct the X-ray diffraction measurement described below.

The X-ray diffraction measurement of the above pigment powders a and b was conducted using the RINT 2500 (trade name, manufactured by Rigaku Industrial Corp.). The pigment pastes c and d were dried by using an evaporator to prepare powders c and d from respective paste. X-ray diffraction of the powder c and d from the respective paste was measured. As a result, crystallite diameters of the pigment powders a and b were 248±50 Å, and 233±50 Å, respectively. In the spectra of the pigment pastes c and d, a halo was observed in the 2θ range of 4 deg to 70 deg. Thus, the pigment particle powders prepared in Examples 6 and 7 had a crystalline structure. Further, the X-ray diffraction measurement revealed that the above pigment powders a and b are different in the spectral form the powder of C.I. pigment red 122, the powder of C.I. pigment violet 19 and a mixture of these powders, respectively.
(Preparation of Pigment Paste)

To the pigment powder a, tetramethylhydroxide was added in a small amount necessary for neutralization, and was followed by addition of a small amount of No 5 solvent (hereinafter referred to as solvent) and kneading with a super mixer ARE-250 (manufactured by Thinky corporation), thereby to obtain a pigment paste a. Similarly, a pigment paste b was obtained from the pigment powder b. To the pigment pastes c and d, tetramethylhydroxide was added in a small amount necessary for neutralization, and was followed by addition of a small amount of the solvent and kneading with the super mixer ARE-250 (manufactured by Thinky corporation), thereby to obtain a pigment pastes c and d for use in the Comparative Example.
(Preparation of Resin Varnish)

Rosin-modified phenol resin (TESPOL 1355 manufactured by Hitachi Kasei Polymer Co., Ltd.) was dissolved by heating in a mixed solvent of linseed oil and No 5 solvent to obtain resin varnish A (resin concentration: 55% by mass). Further, rosin-modified phenol resin (TESPOL 1304 manufactured by Hitachi Kasei Polymer Co., Ltd.) was dissolved by heating in a mixed solvent of linseed oil and No 5 solvent to obtain resin varnish B (resin concentration: 55% by mass).

(Preparation of Resin for Dispersing Pigments)

A mixture of 100 parts of 12-hydroxystearic acid, 10 parts of xylene and 0.1 parts tetra-n-butyl titanate was placed in a separable flask equipped with a condenser, a water separator, a thermometer and a nitrogen-introducing tube, and heated with stirring at a temperature of 180° C. to 200° C. for 6 hours. At this time, mixing was performed under nitrogen gas stream while separating the produced water to the water separator. Subsequently, xylene was removed by distillation under reduced pressure to obtain a polyester resin having a carboxyl group (hereinafter, described as a resin for dispersing pigments). The resin was a pale brown polymer having a mass average molecular weight of 4,000 and an acid value of 30.

(Ink Composition)

Ink bases 1 to 4 were prepared according to the formulae set forth below. It should be noted that at the beginning of the preparation, the solvent was added to each of pigment pastes a to d and subjected to a thorough ultrasonic treatment, and thereafter other components were added thereto with stirring, and then kneaded by a three-roll mill.

(Formula of Ink Base)

| Ingredient | Unit (mass parts) | | | |
| --- | --- | --- | --- | --- |
| | Base 1 | Base 2 | Base 3 | Base 4 |
| Pigment Paste a | 40 | | | |
| Pigment Paste b | | 40 | | |
| Pigment Paste c | | | 40 | |
| Pigment Paste d | | | | 40 |
| Resin for Dispersing Pigments | 8 | 8 | 8 | 8 |
| Resin Varnish A | 42 | 42 | 42 | 42 |
| Solvent | 10 | 10 | 10 | 10 |

Ink compositions 1 to 4 were prepared using the above ink bases in accordance with the formula set forth below. It should be noted that the ink base corresponds to the ink composition 1, and likewise the ink bases 2 to 4 correspond to the ink compositions 2 to 4 respectively.

(Formula of Ink)

| Ingredient | mass parts |
| --- | --- |
| Ink Base | 40 |
| Resin Varnish B | 50 |
| Wax | 5 |
| Solvent | 5 |

In the above formula, as the wax, there was used a polyethylene wax compound manufactured by Shamrock Co. As the resin varnish B, there was used a liquid having a resin concentration of 55% by mass that was obtained by dissolving and heating Rosin-modified phenol resin (TESPOL 1304 manufactured by Hitachi Kasei Polymer Co., Ltd.) in a mixed solvent of linseed oil and the above solvent.

In the preparation of the ink composition, the solvent was added to the ink base and subjected to a thorough ultrasonic treatment, and thereafter other components were added thereto with stirring, and then the solvent was further added thereto so that the pigment content was ultimately 15%.

[Evaluation of Average Particle Size]

A TEM average particle size of pigment particles contained in the ink compositions 1 to 4 was calculated.

[Evaluation of Transparency]

Each of the ink compositions 1 to 4 was coated on a 60 μm thick polyethylene terephthalate (PET) sheet using a bar coater and dried to evaluate transparency visibly according to the criterion described below.

2: excellent
1: poor

[Evaluation of Light Fastness]

Each of the ink compositions 1 to 4 was coated on a Premium Glossy Photo Paper (manufactured by Seiko-Epson Co.) using a bar coater and dried. Thereafter, an initial reflection density (I0) of each of the resultant coatings was measured, and then each of the coatings was irradiated by a xenon lamp with illuminance of 170,000 lux for 4 days to measure a reflection density (I1). A ratio of I1/I0(%) was calculated and evaluation was performed according to the criterion as set forth below.

3: 95% to 100%
2: 90% to 95%
1: less than 90%

The results of each of evaluations are shown in Table 5.

TABLE 5

| Sample | TEM Average Transparency | Light Fastness | Size [nm] |
| --- | --- | --- | --- |
| Ink Composition 1 (Example 6) | 35.9 | 2 | 3 |
| Ink Composition 2 (Example 7) | 37.8 | 2 | 3 |
| Ink Composition 3 (Comparative Example 7) | 37.2 | 2 | 1 |
| Ink Composition 4 (Comparative Example 8) | 90.4 | 1 | 2 |

As seen from Table 5, printed articles 1 and 2 of the present invention that were produced using the ink compositions 1 and 2 respectively are excellent in both transparency and light fastness, even though the ink compositions 1 and 2 were of high concentration.

From the above results, it is understood that particles of water-insoluble colorants contained in the dispersion of the present invention has an excellent light fastness, even though the particles are fined to a nanometer size. Further, it is understood that the particles have a different crystal form those obtained when a pigment is used solely or in a simple mixture of two or more pigments, and show a different color reproduction gamut from those of pigments. Further, according to the dispersion of the present invention, it is possible to maintain a viscosity of the dispersion at a low level, even though the dispersion is of high concentration, which is preferable to use as an ink. Further, the dispersion of the present invention is suitably used to prepare a recording liquid capable of reducing a difference in tints between a low density region and a high density region of the printed article in which a shadow nuances is adjusted by an injection amount of ink as in the inkjet recording method or the like, or by a printing method including a means that adjusts a concentration or thickness of the recording liquid.

Having described our invention as related to the present embodiments, it is our intention that the invention not be limited by any of the details of the description, unless otherwise specified, but rather be construed broadly within its spirit and scope as set out in the accompanying claims.

What we claim is:

1. A dispersion comprising:
    particles of a water-insoluble colorant containing at least two kinds of pigments dispersed with a dispersing agent in a medium containing water,
    wherein an average size of the particles is from 5 nm to 50 nm, and
    wherein the water-insoluble colorant has a crystalline structure, and a light-scattering intensity is 30,000 cps or less, when a peak value of absorbance in the visible light region is set to 1.

2. The dispersion according to claim 1, wherein the average size of the particles is from 5 nm to 40 nm.

3. The dispersion according to claim 1, wherein the water-insoluble colorant is a solid solution comprising at least two kinds of pigments.

4. The dispersion according to claim 1, wherein the water-insoluble colorant is a solid solution comprising at least two kinds of organic pigments selected from a group consisting of unsubstituted quinacridone, 2,9-dimethylquinacridone, 4,11-dichroloquinacridone, and 6,13-dihydroquinacridone.

5. A recording liquid comprising:
    a dispersion comprising particles of a water-insoluble colorant containing at least two kinds of pigments dispersed with a dispersing agent in a medium containing water,
    wherein the water-insoluble colorant has a crystalline structure, and a light-scattering intensity is 30,000 cps or less, when a peak value of absorbance in the visible light region is set to 1, and
    wherein the water-insoluble colorant is contained in an amount of 0.1 to 15% by mass with respect to a total mass of the recording liquid.

6. The recording liquid according to claim 5, wherein the recording liquid is an inkjet recording liquid.

7. An ink set comprising:
    an inkjet recording liquid,
    wherein the inkjet recording liquid is a dispersion comprising particles of a water-insoluble colorant containing at least two kinds of pigments dispersed with a dispersing agent in a medium containing water,
    wherein the water-insoluble colorant has a crystalline structure, and a light-scattering intensity is 30,000 cps or less, when a peak value of absorbance in the visible light region is set to 1, and
    wherein the water-insoluble colorant is contained in an amount of 0.1 to 15% by mass with respect to a total mass of the recording liquid.

8. A dispersion comprising particles of a water-insoluble colorant containing at least two kinds of pigments dispersed with a dispersing agent in a medium, wherein an average size of the particles is from 5 nm to 50 nm, and the water-insoluble colorant has a crystalline structure.

9. The dispersion according to claim 8, wherein the average size of the particles is from 5 nm to 40 nm.

10. The dispersion according to claim 8, wherein the water-insoluble colorant is a solid solution comprising at least two kinds of pigments.

11. The dispersion according to claim 8, wherein the water-insoluble colorant is a solid solution comprising at least two kinds of organic pigments selected from a group consisting of unsubstituted quinacridone, 2,9-dimethylquinacridone, 4,11-dichroloquinacridone, and 6,13-dihydroquinacridone.

12. A recording liquid comprising:
    a dispersion comprising particles of a water-insoluble colorant containing at least two kinds of pigments dispersed with a dispersing agent in a medium,
    wherein an average size of the particles is from 5 nm to 50 nm, and the water-insoluble colorant has a crystalline structure, and
    wherein the water-insoluble colorant is contained in an amount of 0.1 to 15% by mass with respect to a total mass of the recording liquid.

13. The recording liquid according to claim 12, wherein the recording liquid is an inkjet recording liquid.

14. An ink set comprising:
    an inkjet recording liquid,
    wherein the inkjet recording liquid is a dispersion comprising particles of a water-insoluble colorant containing at least two kinds of pigments dispersed with a dispersing agent in a medium,
    wherein an average size of the particles is from 5 nm to 50 nm, and the water-insoluble colorant has a crystalline structure, and
    wherein the water-insoluble colorant is contained in an amount of 0.1 to 15% by mass with respect to a total mass of the recording liquid.

15. A method of producing a dispersion containing a water-insoluble colorant, which comprises:
    (1) a step of dissolving a water-insoluble colorant together with a dispersing agent in an aprotic water-soluble organic solvent in the presence of alkali, to prepare a solution thereof;
    (2) a step of preparing a dispersion by mixing the resultant solution with an aqueous solvent, in which particles of the water-insoluble colorant and the dispersing agent are dispersed in a medium containing water;
    (3) a step of converting the particles of the water-insoluble colorant into a soft aggregate thereof, the aggregate of the water-insoluble colorant being capable of re-dispersing, and then separating the soft aggregate from the dispersion;
    (4) a step of filtrating and washing the soft aggregate with an ester series solvent or a ketone series solvent; and
    (5) a step of unbinding aggregation of the soft aggregate, and re-dispersing the unbound water-insoluble colorant in a re-dispersion medium, wherein particles of the water-insoluble colorant containing at least two kinds of pigments, and
    wherein the water-insoluble colorant has a crystalline structure.

16. The method of producing a dispersion according to claim 15, wherein the re-dispersion medium is a medium containing water so that the dispersion after re-dispersion is an aqueous dispersion.

17. The method of producing a dispersion according to claim 15, wherein the dispersing agent is a polymer compound that is soluble or dispersible in the ester series solvent or the ketone series solvent.

18. A dispersion containing a water-insoluble colorant and produced by a method which comprises:
    (1) a step of dissolving a water-insoluble colorant together with a dispersing agent in an aprotic water-soluble organic solvent in the presence of alkali, to prepare a solution thereof;
    (2) a step of preparing a dispersion by mixing the resultant solution with an aqueous solvent, in which particles of the water-insoluble colorant and the dispersing agent are dispersed in a medium containing water;
    (3) a step of converting the particles of the water-insoluble colorant into a soft aggregate thereof, the aggregate of the water-insoluble colorant being capable of re-dispersing, and then separating the soft aggregate from the dispersion;

(4) a step of filtrating and washing the soft aggregate with an ester series solvent or a ketone series solvent; and (5) a step of unbinding aggregation of the soft aggregate, and re-dispersing the unbound water-insoluble colorant in a re-dispersion medium, wherein particles of the water-insoluble colorant containing at least two kinds of pigments, and wherein the water-insoluble colorant has a crystalline structure.

19. A recording liquid containing a dispersion containing a water-insoluble colorant and produced by a method which comprises:

(1) a step of dissolving a water-insoluble colorant together with a dispersing agent in an aprotic water-soluble organic solvent in the presence of alkali, to prepare a solution thereof;

(2) a step of preparing a dispersion by mixing the resultant solution with an aqueous solvent, in which particles of the water-insoluble colorant and the dispersing agent are dispersed in a medium containing water;

(3) a step of converting the particles of the water-insoluble colorant into a soft aggregate thereof, the aggregate of the water-insoluble colorant being capable of re-dispersing, and then separating the soft aggregate from the dispersion;

(4) a step of filtrating and washing the soft aggregate with an ester series solvent or a ketone series solvent; and (5) a step of unbinding aggregation of the soft aggregate, and re-dispersing the unbound water-insoluble colorant in a re-dispersion medium, wherein particles of the water-insoluble colorant containing at least two kinds of pigments, and wherein the water-insoluble colorant has a crystalline structure.

20. The dispersion according to claim 1, wherein the water-insoluble colorant having a crystalline structure is defined as follows:

when the water-insoluble colorant in a dispersion is subjected to a powder X-ray diffraction analysis, the results of analysis do not meet any one of the following (i) and (ii):

(i) a halo that is specific to amorphous (non-crystalline) substance is observed, or (ii) a crystallite diameter is less than 20 Å, or the substance is supposed to be amorphous.

21. The dispersion according to claim 1, wherein a crystallite diameter of the crystalline structure is greater than or equal to 20 Å and less than 350 Å.

22. The dispersion according to claim 1, wherein the crystalline structure is formed by washing a soft aggregate with an organic solvent.

* * * * *